United States Patent
Merani et al.

(10) Patent No.: US 11,712,007 B2
(45) Date of Patent: Aug. 1, 2023

(54) FLUSH FRONT LANDSCAPE EDGING SYSTEM

(71) Applicant: Colmet LLC, Garland, TX (US)

(72) Inventors: Mark Christopher Merani, Rowlett, TX (US); Keith J. Orgeron, Spring, TX (US); Valeriy Mitrofanovich Kasyanenko, Santa Clara, CA (US); Robert Glen Allen, Mesquite, TX (US)

(73) Assignee: Colmet LLC, Garland, TX (US)

( * ) Notice: Subject to any disclaimer, the term of this patent is extended or adjusted under 35 U.S.C. 154(b) by 5 days.

(21) Appl. No.: 17/485,300

(22) Filed: Sep. 24, 2021

(65) Prior Publication Data
US 2022/0095551 A1    Mar. 31, 2022

Related U.S. Application Data

(60) Provisional application No. 63/083,694, filed on Sep. 25, 2020.

(51) Int. Cl.
*A01G 9/28* (2018.01)

(52) U.S. Cl.
CPC ..................... *A01G 9/28* (2018.02)

(58) Field of Classification Search
CPC ........ A01G 9/28; E01C 11/221; E01C 11/222
See application file for complete search history.

(56) References Cited

U.S. PATENT DOCUMENTS

| | | |
|---|---|---|
| X397732 | 2/1889 | Landis |
| X696792 | 1/1902 | Bedell |
| 2,662,342 A | 12/1953 | Peterson |
| 2,809,809 A * | 10/1957 | Charles ............. A01G 9/28 D8/1 |
| 2,821,809 A * | 2/1958 | Collien ............. A01G 9/28 47/33 |

(Continued)

FOREIGN PATENT DOCUMENTS

| | | |
|---|---|---|
| EP | 0671527 A1 | 9/1995 |
| FR | 2568615 A2 | 2/1986 |
| KR | 2019-0008033 A | 1/2019 |

OTHER PUBLICATIONS

Corten Landscape Edging, 3" & 5"; Gardener's Supply Company; info@gardeners.com; 1318V Rev 10/19.

*Primary Examiner* — Theodore V Adamos
(74) *Attorney, Agent, or Firm* — John G. Fischer, Esq.; Scheef & Stone, L.L.P.

(57) ABSTRACT

The present invention discloses a new landscape edging system in which multiple adjacent edging sections are interconnectable prior to inserting stakes. An edging section is provided. A first transition extends from one end and a second transition extends from the opposite end. A first slot extends to the midpoint of the first transition. A second slot extends to the midpoint of the second transition. A connector extends outwardly from each transition. Each connector has an upper and lower tab. The first slot receives the second transition of an adjacent edging section as the second slot receives the first transition of the adjacent edging section. This interlocks the edging sections together. As interlocked, the upper and lower tabs on the connectors form a rectangular structure for receiving a V-shaped stake. Stake tabs on the stake engage the upper tabs top secure the edging system to the soil.

42 Claims, 22 Drawing Sheets

(56) References Cited

U.S. PATENT DOCUMENTS

| | | | |
|---|---|---|---|
| 4,046,356 A | | 9/1977 | Rose |
| 4,628,632 A | | 12/1986 | Zwier |
| 4,647,491 A | | 3/1987 | Ireland et al. |
| 4,702,034 A | | 10/1987 | Ferguson et al. |
| 4,934,093 A | | 6/1990 | Yanna |
| 5,020,272 A | | 6/1991 | Herrema et al. |
| 5,212,917 A | | 5/1993 | Kurtz et al. |
| 5,301,461 A | * | 4/1994 | Zwier ............... A01G 9/28 47/33 |
| 5,375,369 A | | 12/1994 | VerHoeve |
| 5,771,631 A | | 6/1998 | Dawson |
| 5,941,018 A | * | 8/1999 | Herrema ............... A01G 9/28 47/33 |
| 6,071,038 A | | 6/2000 | Strobl, Jr. |
| 6,324,783 B1 | | 12/2001 | McIntyre et al. |
| 6,345,465 B1 | * | 2/2002 | Allen ............... A01G 9/28 47/33 |
| 6,629,383 B2 | | 10/2003 | Allen et al. |
| D577,975 S | | 10/2008 | Bahler |
| 7,555,863 B1 | * | 7/2009 | Caldwell ............ A01G 9/28 47/33 |
| 10,398,093 B2 | | 9/2019 | Bahler et al. |
| D864,678 S | | 10/2019 | Bahler et al. |
| 10,729,077 B2 | | 8/2020 | Bahler et al. |
| 2012/0311927 A1 | * | 12/2012 | Bolin ............... A01G 9/28 47/33 |
| 2019/0203491 A1 | * | 7/2019 | Bahler ............... E04H 17/22 |
| 2020/0288647 A1 | | 9/2020 | Amrine et al. |

* cited by examiner

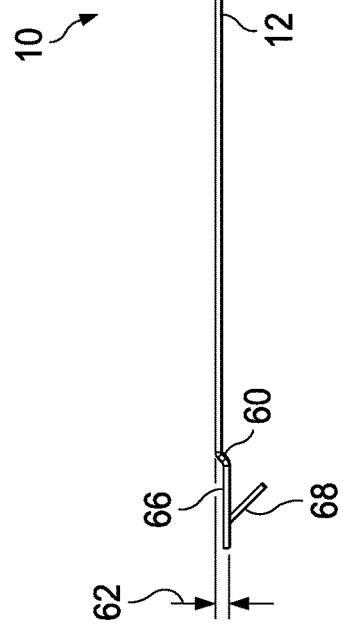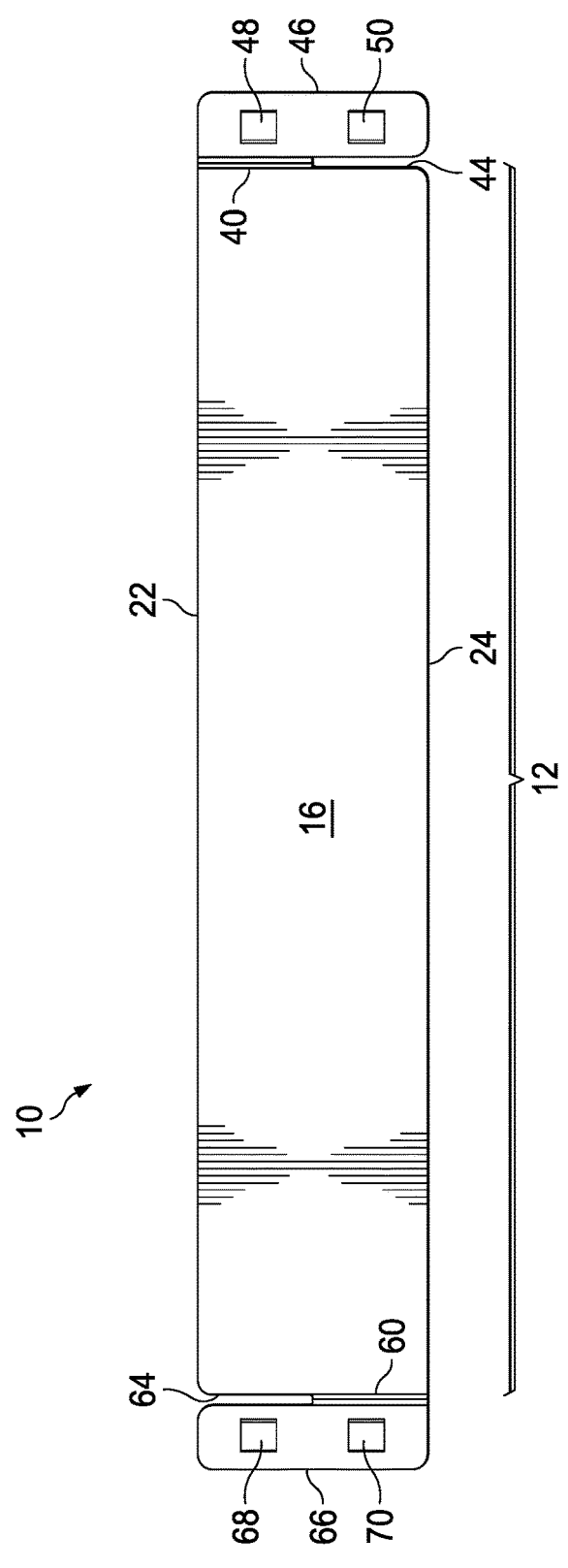

FLUSH FRONT LANDSCAPE EDGING SYSTEM

TECHNICAL FIELD OF INVENTION

The present invention relates to the field of landscape barriers, and particularly to the design of flexible landscape edging, and more particularly to the design of flexible landscape edging with interlocking ends receivable of tapered stakes for securing the edging to soil.

BACKGROUND OF THE INVENTION

This invention relates to the problem of segregating an area of a garden or landscape scheme from a dissimilar neighboring landscape. In particular, the invention also relates to the problems that arise when flexible edging materials are used which require stakes for securing the edging to the soil. More particularly, this invention addresses the problems of installation and retention to provide a more attractive flexible landscape edging system. There are numerous domestic and commercial applications in which it is desirable to separate dissimilar forms of vegetation or landscape schemes. Of the various applications, there are numerous reasons for the need to separate landscape schemes, including aesthetics, incompatibility with neighboring vegetation, and differences in climatic requirements.

There are a number of well-known landscape barrier systems currently available, including wooden logs, flexible metal strips, flexible plastic strips, clay forms, stone, and brick. All these systems are known to satisfactorily segregate the landscape schemes with certain differences noted in their overall performances.

Of all the landscape barrier systems commercially available, flexible strips made of materials such as metal and plastic are among the most popular due to their flexible design options, ease of installation, and low cost. These systems allow for end-to-end series attachment of like sections of the system. This permits the construction of a continuous and uninterrupted landscape barrier of any length desired. The systems can be used to block the growth of roots between vegetation and incompatible neighboring vegetation, or between vegetation and a non-living landscape scheme. For this application, it is advisable to place the edging system low into the soil to block the growth of roots across the edging line. The systems can also be used to decoratively segregate dissimilar landscape schemes where root blocking is not the objective. In these instances, it is not necessary to place the edging as deeply into the soil. In either case, it is advantageous to secure the edging system to the soil with tapered stakes. The tapered stakes may be positioned intermittently along the length of long flexible strips, and at its end to lock a first length of flexible strip to a second length of flexible strip. To keep the stakes from bending, they may be made of a metal gage that is thicker than that of the edging portion.

These systems suffered from a number of difficulties related to manufacturing expense, processing, and shipping which were overcome by later developments embodied in U.S. Pat. Nos. 6,345,465, and 6,629,383.

The above-named patents solved many of the manufacturing problems related to the prior systems and became the most popular system in the market for many years. However, these systems have their own disadvantages.

A primary disadvantage of these systems was the inconvenience of removing the stakes that were attached to the edging sections. Consumers often found this difficult and frustrating. Another primary disadvantage of these systems was that they required careful alignment of the intersections of adjacent landscape edging portions prior to inserting stakes.

Another disadvantage of this system was that prior to significant alignment there was nothing to hold adjacent landscape edging sections in position for receiving stakes, making it cumbersome and difficult for a single person to install the edging. A related disadvantage of this system was that the required alignment was in all 3 dimensions, making connection to adjacent sections on curves extremely difficult.

Another disadvantage of these systems was that when assembled and viewed from the front, they provided a very mechanical appearance as the intersections of adjacent edging sections comprise a significant percentage of the length of the edging section. Another disadvantage of these systems is that the pocket punch outs for receiving stakes are visible from the front and add to the mechanical appearance of the edging.

Another disadvantage of the systems was that soil upheave would force the stake from the pocket and then cause the edging to become loose and fall over. Another disadvantage of the systems was that the stakes were not very strong when impacted with the hammer and could bend if met with any resistance by refusal material in the soil.

Another disadvantage of these systems was that there was no easy way to terminate an edging section. It was generally necessary to sawcut the landscape edging system. This was due again, in part, to the extended length of the connection system between adjacent edging sections which required two stakes and overlap in alignment of four pockets.

The present disclosure solves these and other problems to provide a much-improved landscape edging system that is easier to install, easier to terminate ends of sections, is easier to align, and utilizes a stronger stake system.

In summary, the preferred embodiments of the present invention provide a unique solution to the engineering constraints and challenges of providing a landscape edging system that overcomes the aforementioned disadvantages.

SUMMARY OF THE INVENTION

A new landscape edging system is disclosed in which multiple adjacent edging sections are connectable. In one embodiment, a first edging section is provided. The edging section has a longitudinal wall portion. The wall portion has a front side and an opposite back side. A wall thickness separates the front side from the back side. The edging section has a top edge and an opposite bottom edge that engages the soil.

A first transition extends transversely and rearward from a first end of the wall portion. A first slot extends from a bottom of the first transition to at least a midpoint of the first transition. A second transition extends transversely and rearward from an opposite second end of the wall portion. A second slot extends from a top of the second transition to at least a midpoint of the second transition.

A first connector extends from the first transition, outwardly and substantially parallel to the wall portion. On the opposite end of the wall portion, a second connector extends from the second transition, outwardly and substantially parallel to the wall portion.

An upper tab and a lower tab extend outward from each of the first and second connectors. The first slot receives the second transition of a second edging section to interlock the edging sections together.

A V-shaped stake is provided. The stake has a pair of opposing rails extending from a radial spine to a rail edge. The stake has an upper end for receiving impact forces, and a pointed lower end for insertion into a soil. A stake tab is formed at the upper end on each rail edge.

The stake is insertable between the upper and lower tabs of the first connector of the first edging section, and the upper tabs and lower tabs of the second connector of the second edging section to further lock the edging sections together. The stake tabs engage the upper tabs of the first connector of the first edging section and the upper tabs of the second connector of the second edging section. Due to the vertical junction at the interlock and by location of stake receiving tabs on the connectors, the connected edging sections appear seamless from the front side of the wall, and thus provide a smooth and flush front landscape edging system.

In another embodiment, upon insertion of the stake, the stake rail edges engage the first connector and the second connector of adjacently connected edging sections, such that when the stake is driven between the upper tabs and lower tabs of the first and second edging sections, the stake imparts a bending moment on the tabs to spread the tabs away from the connectors to secure the stake in interference fit as between the tabs and the connectors. In this embodiment, the upper and lower tabs compress the stake against the first and second connectors to secure the stake in interference fit as between the tabs and the connectors.

In another embodiment, when the stake is driven between the upper tabs and lower tabs of adjacently connected edging sections, the stake tabs impart a downward force on the upper tabs which may be distributed to the interlocked first and second transitions to secure the edging section against the soil.

In another embodiment, the stake has a beveled lower end for reduced resistance to insertion into a soil. The stake may have a pointed portion below the bevel. In another embodiment, the lower end of the stake may have a beveled and pointed lower end located on each rail.

In another embodiment, the stake rails are disposed at an angle of approximately 90° to each other, and the upper and lower tabs extend from the first connector at an angle of between 30° and 45°. In another embodiment, the stake tabs are formed at an approximate right angle to the rails, along an axis approximately parallel to the radial spine.

In another embodiment, the lower tab is located beneath and vertically aligned with the upper tab, and the upper tab and lower tab extend in the direction of the back side of the body.

In another embodiment, the body has a thickness equal to the distance between the front side and the back side, and the first transition and second transition are of a length sufficient to offset the first connector and the second connector from the wall portion by a distance equal to or greater than the thickness.

In another embodiment, the upper and lower connector tabs and stake tabs are formed by stamping. In another embodiment, the stake tabs extend in a direction substantially perpendicular to the rails. In another embodiment, the stake has an aperture located through the radial spine and between the stake tabs to provide a connection structure for cleaning, pretreatment, and coating, for securing multiple stakes together for shipping, and to provide a tool engagement structure for removal of the stake from the soil.

In another embodiment, a pair of opposing upper wall tabs extend outward from the back side of the wall. A pair of opposing lower wall tabs extend outward from the back side of the wall below the upper wall tabs. The upper and lower wall tabs are receivable of a stake for securing a central portion of the edging section to the soil.

In another embodiment, a stop is embossed onto the rail beneath the stake tab and extending rearward. The stop engages the lower tab of a connector to resist soil upheave of the stake.

In another embodiment, an end cap is disclosed. The end cap has a wall portion, a front side, and an opposite backside. A transition extends transversely and rearward from the wall portion. A slot extends from a bottom of the transition to at least a midpoint of the transition. A connector extends from the transition, outwardly and substantially parallel to the wall portion. An upper tab and a lower tab extend from the first connector. The slot of an end cap is receivable of the first or the second transition of an edging section to interlock the end cap and edging section together. The end cap is reversible for use on either end of an edging section.

A stake is insertable between the upper tab and lower tab of the connector of the end cap and the upper tab and lower tab of the first or second connector of the edging section. The stake has stake tabs engageable with the upper tab of the connector of the end cap and the upper tab of the first or second connector of the edging section.

In another embodiment, a landscape edging system is disclosed, comprising a longitudinal edging section. The edging section has a wall portion having a front side and an opposite backside. A first transition extends transversely and rearward from a first end of the wall portion. A first slot extends from a bottom of the first transition to at least a midpoint of the first transition. A first connector extends from the first transition, outwardly and substantially parallel to the wall portion. A first interlock tab extends outward and parallel to the wall portion at a location proximate to the first transition.

A second transition extends transversely and rearward from an opposite second end of the wall portion. A second slot extends from a top of the second transition to at least a midpoint of the second transition. A second connector extends from the second transition, outwardly and substantially parallel to the wall portion. A second interlock tab extends outward and parallel to the wall portion at a location proximate to the second transition.

The first slot engages the second transition of a second edging section. The first interlock tab receives the second connector of the second edging section. In this position, the first slot and first interlock tab connect the first and second edging sections together.

A pair of opposing upper tabs extend outward from the back side of the wall at an acute angle to the wall. A pair of opposing lower tabs extend outward from the back side of the wall at an acute angle to the wall, and in vertical alignment with the upper wall tabs. A stake is insertable between the upper tabs and lower tabs of the wall portion. The stake has stake tabs engageable with the upper tabs of the wall portion to secure the edging section into a soil.

In another embodiment, a V-shaped stake is provided, having a pair of opposing rails extending from a radial spine to a rail edge. The stake has an upper end for receiving impact forces, and a pointed lower end for insertion into a soil. A stake tab is formed at the upper end on each rail edge. The stake is insertable between the upper tabs and lower tabs of the wall portion, where the stake tabs engage the upper tabs of the wall portion to secure the edging section into a soil.

BRIEF DESCRIPTION OF THE DRAWINGS

FIG. 6 is a top view of the landscape edging section illustrated in FIG. 5.

FIG. 7 is a front view of the landscape edging section illustrated in FIG. 5 and FIG. 6.

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
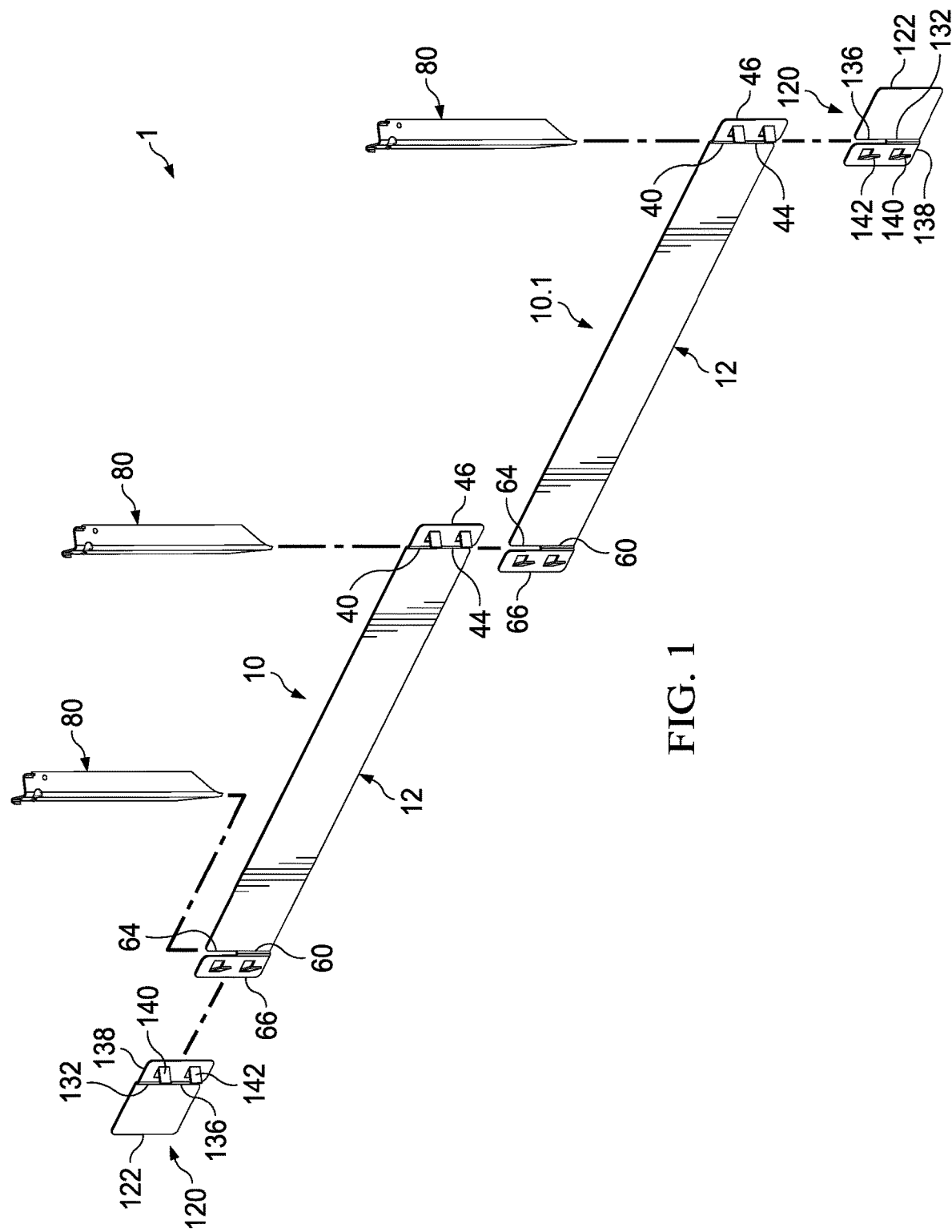
FIG. 1 is an exploded isometric view of a first embodiment of the landscape edging system of the invention.

FIG. 1 is an exploded isometric view of a first embodiment of a landscape edging system 1. As seen in FIG. 1, landscape edging system 1 may be comprised of a first edging section 10 and an adjacent and identical edging section 10.1. Edging section 10 has a wall portion 12 and a first connector 46 on one end connected to wall portion 12 by an offsetting first transition 40 (see FIG. 5). Transition 40 has a first slot 44 extending approximately to a midpoint of transition 40. A second connector 66 is connected to the opposite end of wall portion 12 by an offsetting second transition 60. Transition 60 has a second slot 64 extending approximately to a midpoint of transition 60.

As seen in this view, edging section 10 may be interlocked to adjacent edging section 10.1 by vertically engaging first slot 44 with second slot 64 until first slot 44 receives transition 60 and second slot 64 receives transition 40.

An end cap 120 is provided for engagement with either first connector 46 or second connector 66. As best seen in the front view shown in FIG. 4, first and second end caps 120 provide a smooth and complete appearance at the terminus of each end of landscape edging system 1.

Figure 2:
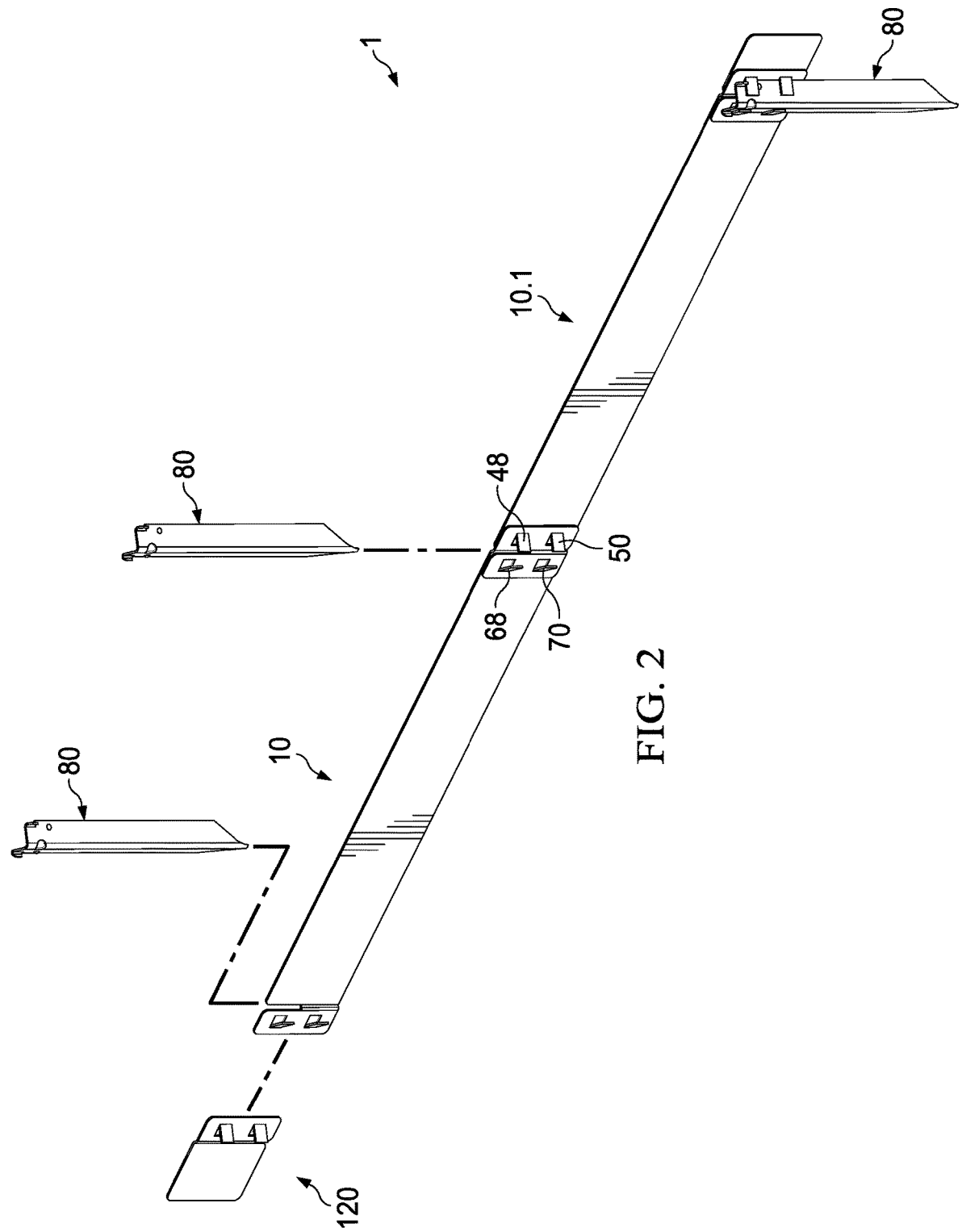
FIG. 2 is a partially exploded isometric view of the embodiment of the landscape edging system of FIG. 1.

FIG. 2 is a partially exploded isometric view of the first embodiment of landscape edging system 1 illustrated in FIG. 1. As seen in FIG. 2, adjacent edging sections 10 and 10.1 are connected together and receivable at their connection of stake 80.

Figure 3:
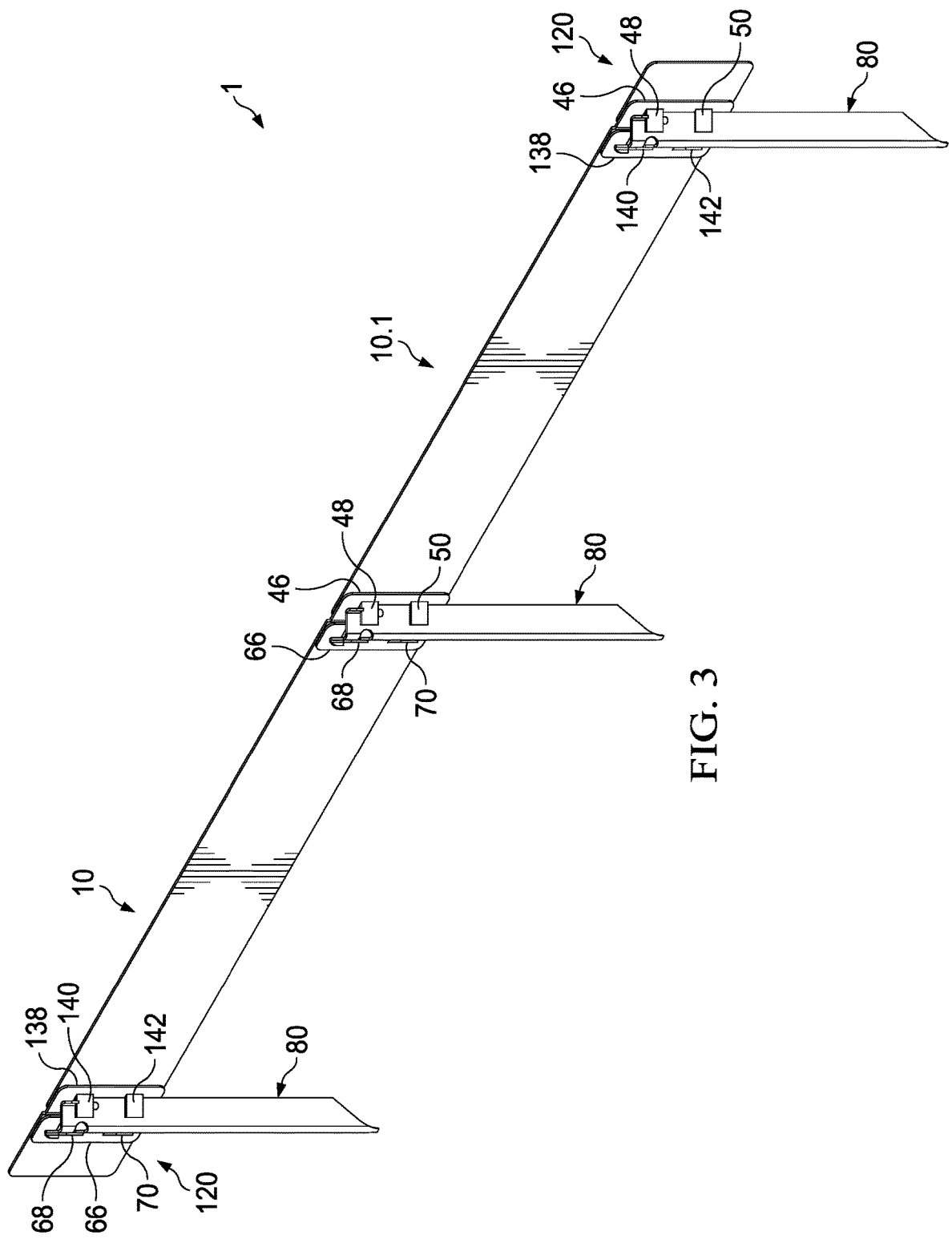
FIG. 3 is an isometric view of the embodiment of the landscape edging system illustrated in FIG. 1 and FIG. 2.

FIG. 3 is an isometric view of the embodiment of landscape edging system 1 illustrated in FIGS. 1 and 2 and illustrating landscape edging system 1 fully assembled. Edging section 10 has a wall portion 12 with first connector 46 on one end and second connector 66 on its opposite end. Edging section 10.1 is identical to edging section 10, having a wall portion 12 with first connector 46 on one end and second connector 66 on its opposite end. First connector 46 of edging section 10 is interlocked with second connector 66 of edging section 10.1.

As is best seen in FIG. 7, a transition 40 connects wall portion 12 to end connector 46. On the opposite end of wall portion 12, a transition 60 connects wall portion 12 to end connector 66. Transition 40 has a slot 44 extending from its lower end to at least a midpoint of its length. Transition 60 has a slot 64 extending from its lower end to at least a midpoint of its length. End connector 46 has an upper tab 48 and a lower tab 50. End connector 66 has an upper tab 68 and a lower tab 70.

As is best seen in the top view of FIG. 6, end connector 46 has an offset 42 in the rearward direction towards back side 16 of wall 12. End connector 66 also has an offset 62 in the rearward direction towards back side 16 of wall 12. Principal to the present disclosure is that landscape edging section 10 is reversible. In that sense, it may be rotated 180° about an axis perpendicular to a center point of wall portion 12. This is extremely advantageous to manufacture in that only one landscape edging section 10 is needed to complete landscape edging section 1. It is further advantageous to the installer who will always recognize the front side from the backside on the basis of offsets 62, greatly simplifying installation.

As best seen in FIG. 1, this configuration permits vertical insertion of edging section 10 with edging section 10.1. To interlock edging section 10 to edging section 10.1, first slot 44 and second slot 64 are vertically aligned, and pass through each other until first slot 44 receives second transition 60 and second slot 64 receives first transition 40. As also seen in FIG. 2, connection of edging section 10 to edging section 10.1 interlocks transition 40 and transition 60 as to secure edging section 10 from lateral disengagement with edging section 10.1.

Referring back to FIG. 3, with edging section 10 connected to edging section 10.1, upper tab 48 of end connector 46 opposes upper tab 68 of end connector 66. Similarly, lower tab 50 of end connector 46 opposes lower tab 70 of end connector 66. The opposing relationship of upper tabs 48 and 68 and lower tabs 50 and 70 form a pocket of four tabs for receiving stake 80.

The slot-transition connection and alignment of edging section 10 to 10.1 provides secured alignment of upper tabs 68 and 48 and lower tabs 70 and 50 for receiving stake 80. This is very advantageous for the installer who would otherwise be trying to hold two pieces of landscape edging in alignment while a second installer inserts stake 80 through the aligned tab pairs 68, 48 and 50, 70. This feature is critical to the installer when installing landscape edging system 1 on a curve (see FIGS. 25-26).

Figure 4:
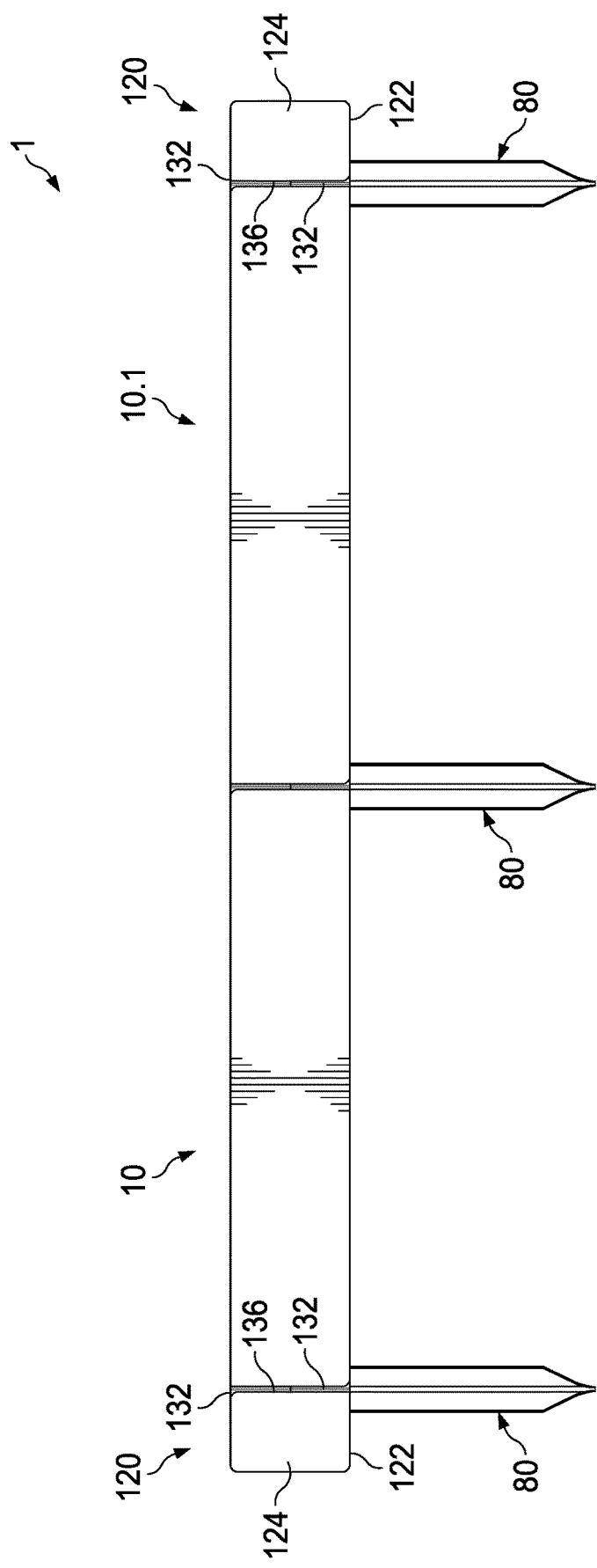
FIG. 4 is a front view of the embodiment of the landscape edging system illustrated in FIGS. 1-3.

FIG. 4 is a front view of the embodiment of landscape edging system 1. As can be seen from this view, other than the vertical junction of transition 40 in upper slot 64 and transition 60 in lower slot 44, where edging section 10 and edging section 10.1 are interlocked, connected edging sections 10, 10.1 appear seamless from front side 14 of wall 12, providing a smooth and flush front landscape edging system 1. This is a significant advantage over prior landscape edging designs that have a very mechanical appearance from the front that displays pocket punch outs, stake portions and significant overlap at end connections.

Figure 5:
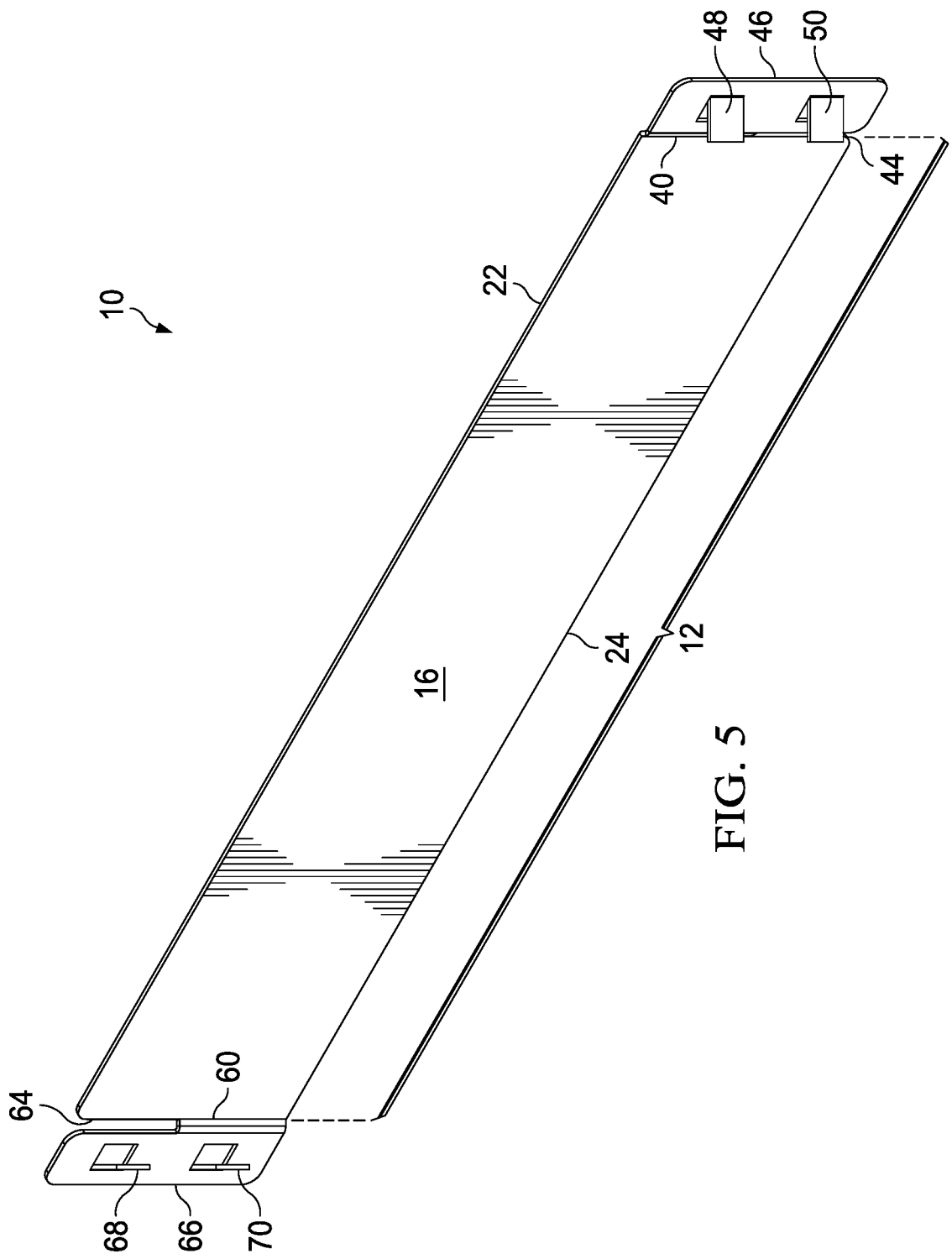
FIG. 5 is an isometric view of the first embodiment of the landscape edging section.

FIG. 5 is an isometric view of the first embodiment of landscape edging section 10, as seen from the back, viewing a back side 16 of wall 12. As seen in FIG. 5, edging section 10 has a longitudinal wall portion 12 having a front side 14 (not visible) and an opposite back side 16.

Lower slot 44 extends from a bottom edge 24 of first transition 40 to at least a midpoint of first transition 40. A second transition 60 extends transversely and rearward from an opposite second end of wall portion 12. Upper slot 64 extends from a top edge 22 of edging section 10 at second transition 60 to at least a midpoint of second transition 60.

Upper tab 48 and lower tab 50 are vertically aligned and extend from first connector 46 at an acute angle to connector 46. Similarly, upper tab 68 and lower tab 70 are vertically aligned and extend from second connector 66 at an acute angle to second connector 66. In one embodiment, the angle of upper tabs 48, 68 and lower tabs 50, 70 to their respective connector is between 30° and 45°. In one embodiment, the angle of upper tabs 48, 68 and lower tabs 50, 70 to their respective connector is between 35° and 40°.

FIG. 6 is a top view of landscape edging section 10 illustrated in FIG. 5. As seen in FIG. 6, edging section 10 has a front side 14 and an opposite back side 16. Front side 14 and back side 16 are separated by a thickness 18. First transition 40 extends transversely and rearward from a first end of wall portion 12.

First connector 46 extends from first transition 40, outwardly and substantially parallel to wall portion 12. Second connector 66 extends from second transition 60, outwardly and substantially parallel to wall portion 12.

In the embodiment illustrated in this view, upper tabs 48 and 68 and lower tabs 50 and 70 have their openings facing wall portion 12. In this manner, each pair of upper and lower tabs 48, 50 and 68, 70 will form the far side engagement mechanism for receiving a stake 80 when edging section 10 is interconnected to an adjacent edging section 10.1. as shown in FIG. 3.

FIG. 7 is a front view of landscape edging section 10. As best seen in this view, first slot 44 extends from bottom edge 24 of first transition 40 to at least a midpoint of first transition 40. Second slot 64 extends from top edge 22 of second transition 60 to at least a midpoint of second transition 60.

Figure 8:
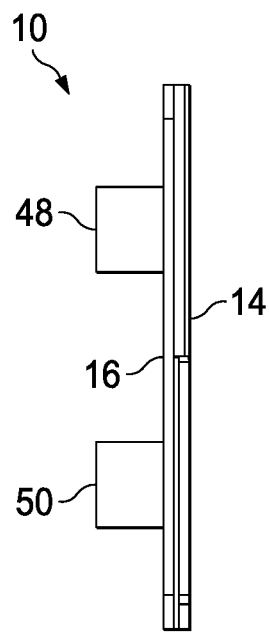
FIG. 8 is an end view of the landscape edging section illustrated in FIG. 7.

FIG. 8 is an end view of the landscape edging section illustrated in FIG. 7 and illustrates upper tab 48 and lower tab 50 extending rearward towards back side 16 of edging section 10.

Figure 9:
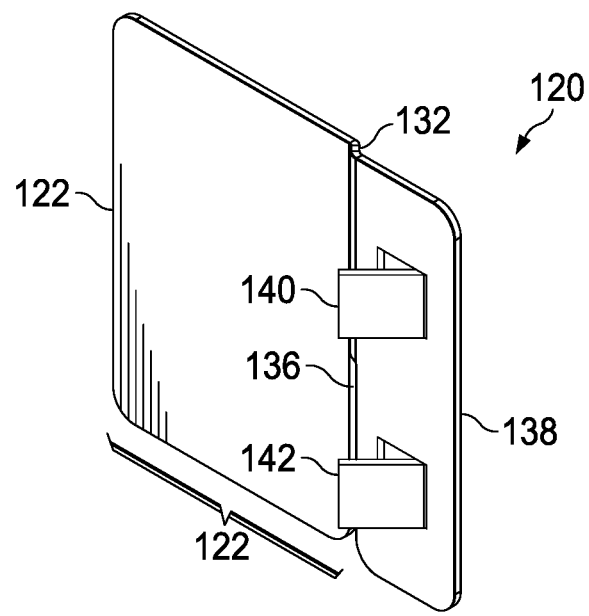
FIG. 9 is an isometric view of a first embodiment of an end cap.

FIG. 9 is an isometric view of an embodiment of an end cap 120. As seen in FIGS. 1-4, end cap 120 can be located at either end of a desired length of landscape edging system 1 to provide an aesthetically pleasing termination that also functions to receive a stake 80 at the end of the last full edging section 10. As seen in FIG. 9, end cap 120 has a wall portion 122 connected to a connector 138 by a transition 132. Transition 132 has a slot 136 extending at least ½ of the length of transition 132.

A first tab 140 and a second tab 142 extend from cap connector 138 and open in the direction of wall portion 122. First tab 140 and a second tab 142 are vertically aligned and extend from cap connector 138 at an acute angle to cap connector 138. In one embodiment, the angle of the first and second tabs 140 and 142 to cap connector 138 is between 30° and 45°.

Figure 10:
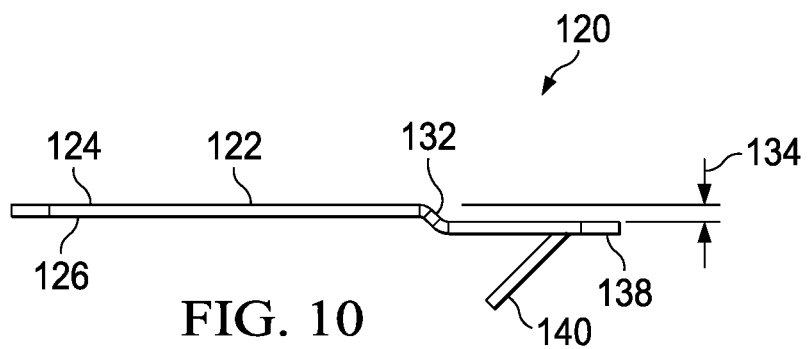
FIG. 10 is a top view of the embodiment of the end cap illustrated in FIG. 9.

FIG. 10 is a top view of the embodiment of end cap 120. As seen in FIG. 10, wall portion 122 has a front side 124 and an opposite back side 126. Cap transition 132 extends transversely and rearward from wall portion 122. Cap connector 138 extends from cap transition 132, outwardly and substantially parallel to wall portion 122, separated by a distance of offset 134.

Figure 11:
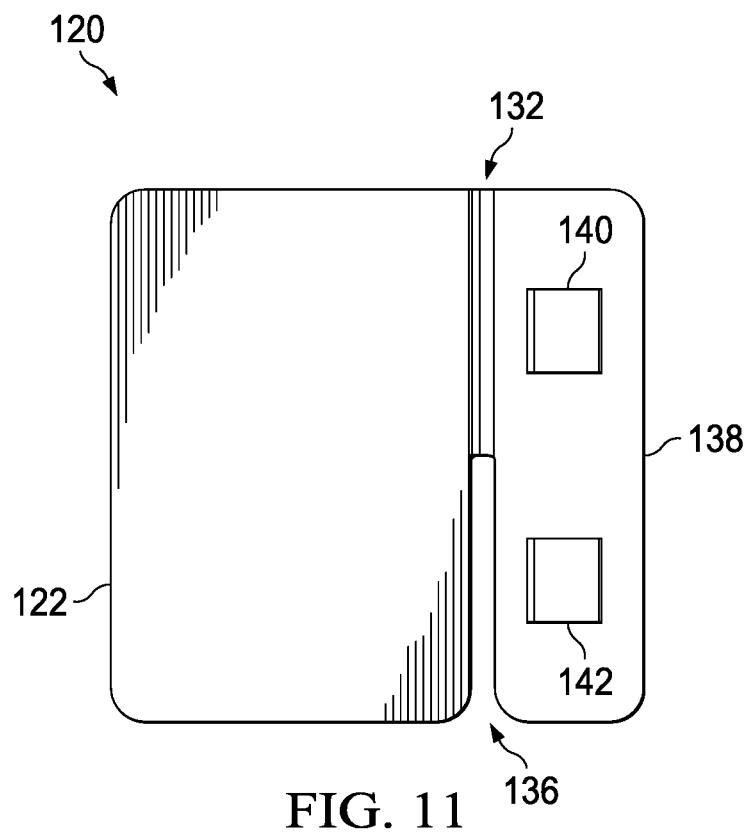
FIG. 11 is a front view of the end cap illustrated in FIG. 9 and FIG. 10.

FIG. 11 is a front view of end cap 120. As best seen in FIG. 11, slot 136 extends along cap transition 132 to a midpoint of cap transition 132. Referring to FIGS. 9 and 11, first tab 140 and second tab 142 extend from cap connector 138. As with edging section 10, first tab 140 and second tab 142 open in the direction of wall portion 122 of end cap 120.

End cap 120 is advantageously reversible, such that it is adapted for use on either end of edging section 10. This is best seen in FIGS. 1 and 4. As seen in FIG. 1, edging section 10 and edging section 10.1 are interconnected in the center of this view. Slot 136 and transition 132 of end cap 120 are interconnectable to first slot 44 and transition 40 of the first connector 46 on one end of edging section 10.1. As also seen in FIG. 1, slot 136 and transition 132 of end cap 120 are interconnectable to second slot 64 and transition 60 of second connector 66 on the opposite end of edging section 10.

As best seen in FIGS. 2 and 3, stake 80 is insertable between first tab 140 and second tab 142 on one side of stake 80, and upper tab 68 and lower tab 70 of second connector 66 on the other side of stake 80.

Referring to FIGS. 3 and 4, end cap 120 is disclosed for location at either end of a desired length of the landscape edging system 1 to provide an aesthetically pleasing termination that functions to receive a stake 80 at the end of the last full edging section 10. End cap 120 and is merely flipped over for use on the opposite end of edging section 10.

As best seen in FIGS. 2 and 3, stake 80 is insertable between upper tab 140 and lower tab 142 on one side of stake 80, and upper tab 48 and lower tab 50 of first connector 46 on the other side of stake 80.

Figure 12:
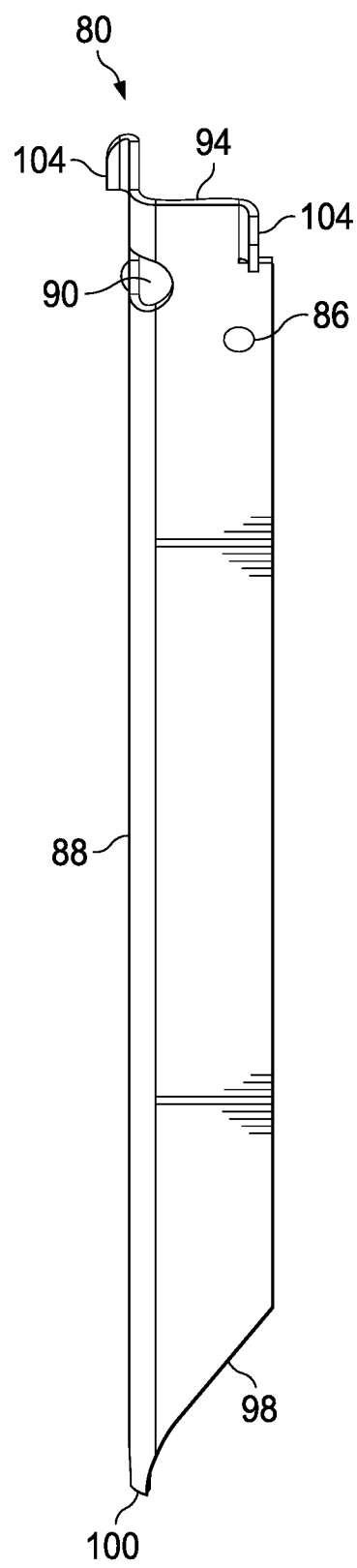
FIG. 12 is an isometric view of an embodiment of a stake specially designed for use with the landscape edging system.
Figure 13:
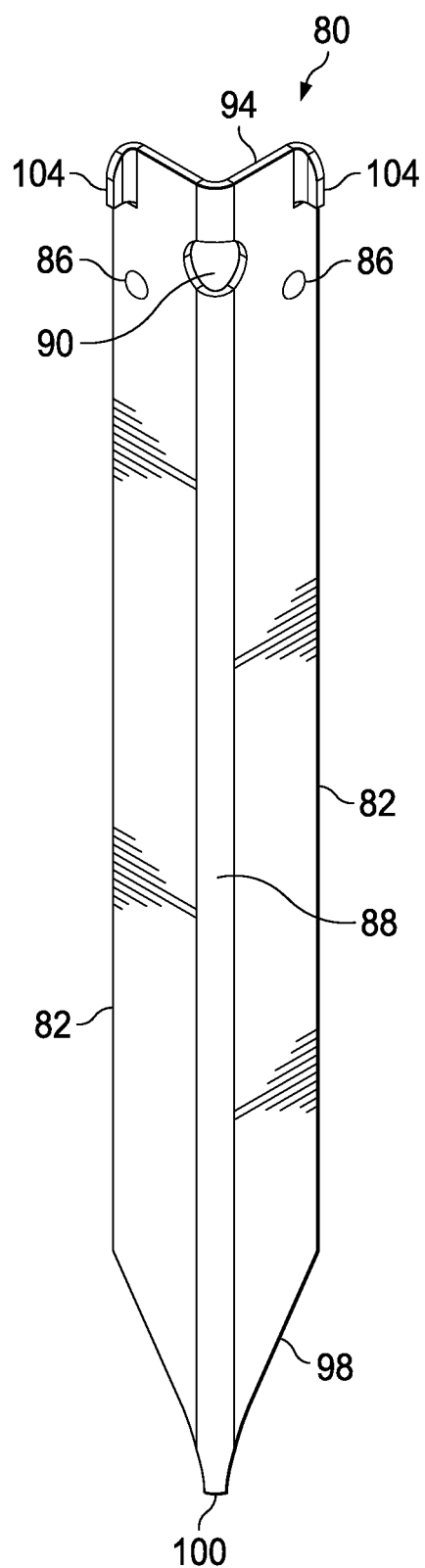
FIG. 13 is an isometric front view of the embodiment of the stake illustrated in FIG. 12.

FIG. 12 is an isometric view of an embodiment of stake 80 specially designed for use with landscape edging system 1. FIG. 13 is an isometric front view of the embodiment of stake 80. As can be seen in FIGS. 12 and 13, stake 80 is a generally V-shaped stake, having a pair of opposing rails 82 extending from a radial spine 88. In one embodiment, stake rails 82 are arranged at a substantially right angle to each other. Stake 80 has an upper end 94 for receiving impact forces to drive stake 80 in a soil to secure edging system 1 in place.

Stake 30 has a pointed lower end 100 for insertion into the soil. Stake 80 has a beveled edge 98 extending between each rail edge 82 and pointed end 100. A stake tab 104 is formed at upper end 94 on each rail 82. In one embodiment, stake tabs 104 extend in a direction substantially perpendicular to rails 82. By forming stake tabs 104 on upper end 94 of each rail 82, a larger strike surface is provided for the installer to drive stakes 80 into the soil.

An embossed stop 86 may be located on each rail 82 at a position beneath stake tabs 104 by a distance equal to the width of upper tabs 48 and 68 and extending rearward. An aperture 90 may be located on radial spine 88 of stake 80. Aperture 90 serves multiple functions. First, it provides a connection structure for securing multiple stakes 80 together for shipping. Second, it provides a tool engagement structure for removal of stake 80 from the soil. Third, it provides a structure for hanging stake 80 during surface cleaning, treatment, and powder coating applications.

Figure 14:
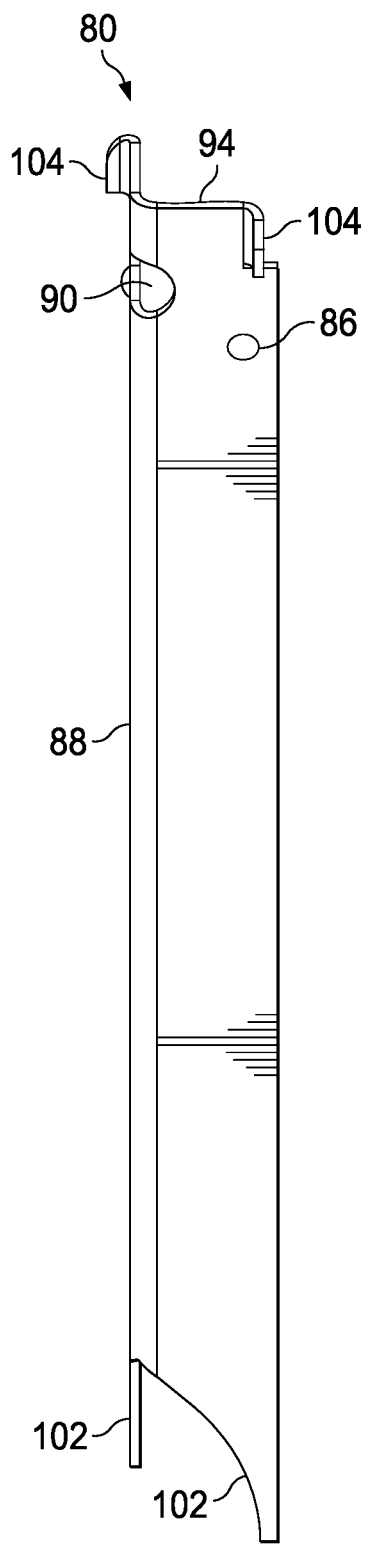
FIG. 14 is an isometric view of an embodiment of the stake having a double pointed end.
Figure 15:
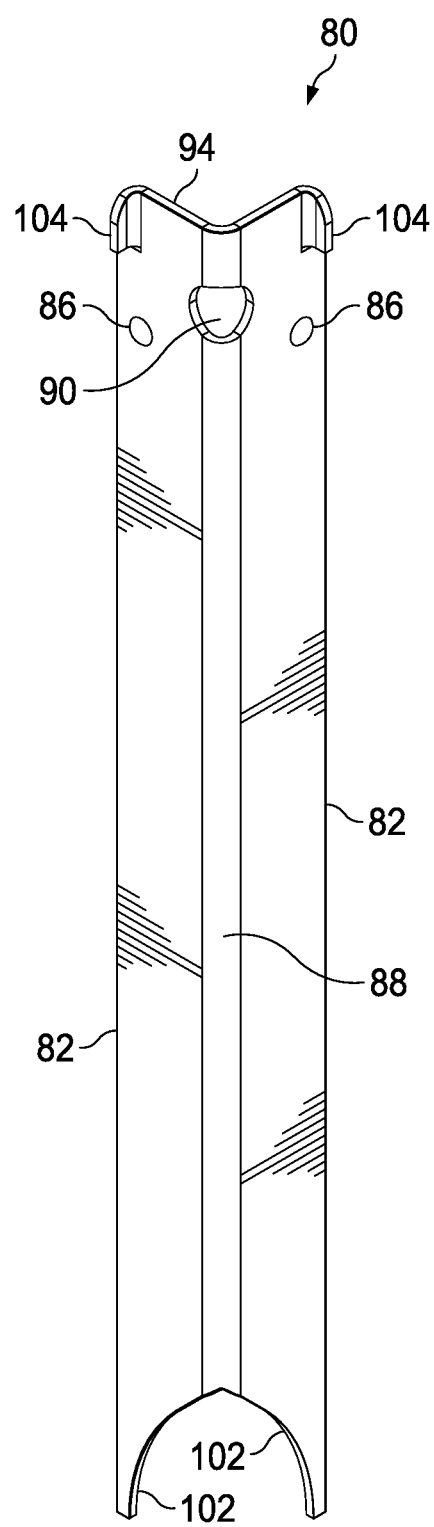
FIG. 15 is an isometric front view of the embodiment of the stake illustrated in FIG. 14.

FIG. 14 is an isometric view of an embodiment of stake 80 in which stake 80 has a double pointed end 102. FIG. 15 is an isometric front view of the embodiment of stake 80 illustrated in FIG. 14. The embodiment illustrated in FIG. 14 and FIG. 15 is identical to the embodiment of FIG. 12 and FIG. 13 except that in this embodiment, stake 80 has a double pointed end 102.

Double pointed end 102 has the advantage of immediate alignment with upper tabs 68 and 48 and lower tabs 70 and 50 as it passes through them during installation, and thus ensures that double pointed end 102 will engage the soil in perpendicular alignment relative to landscape edging sections 10 and 10.1.

Figure 16:
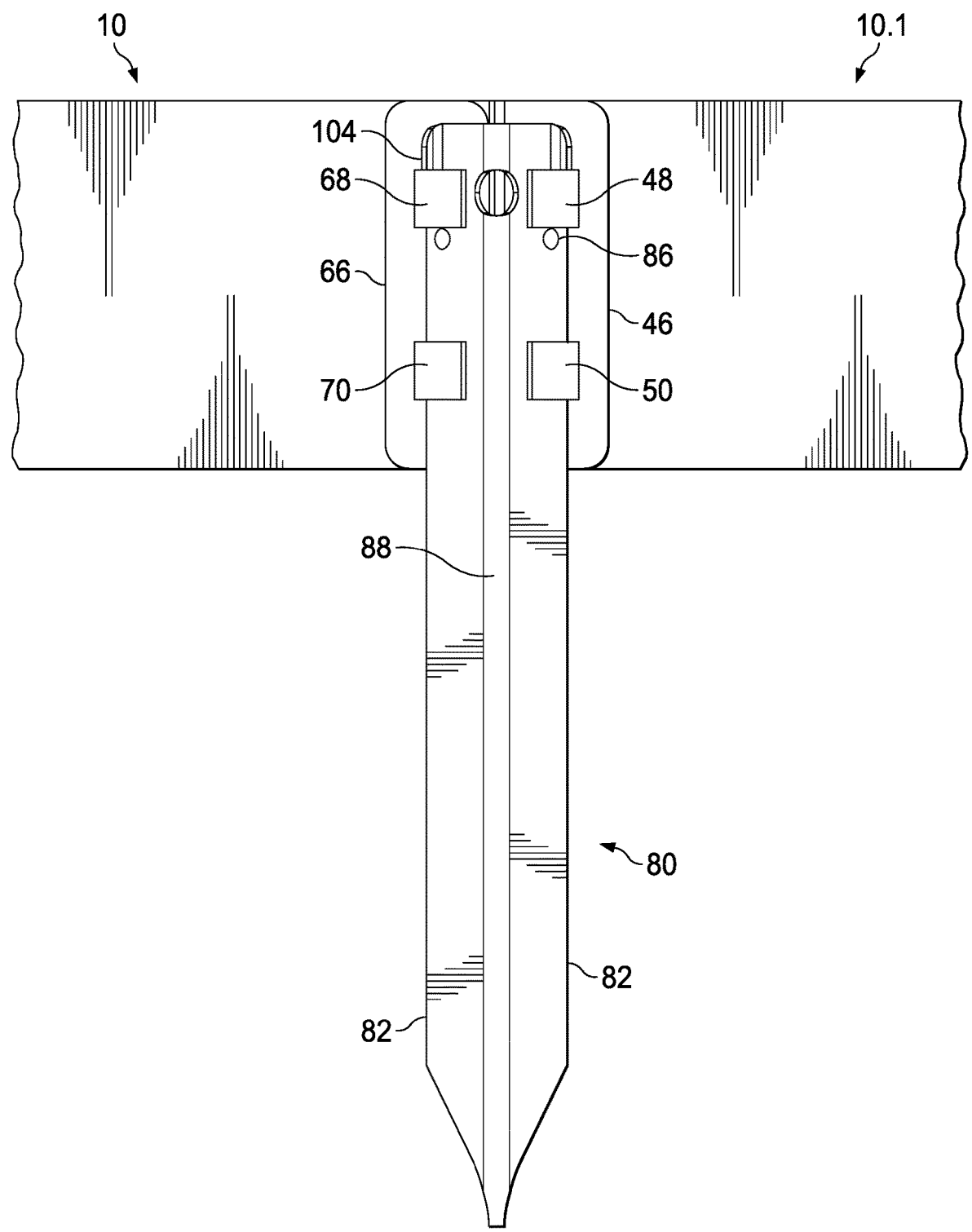
FIG. 16 is a back view illustrating the connectivity of adjacent landscape edging sections, illustrated as secured together by the engagement of a stake with tabs on the connectors of the adjacent edging sections.

FIG. 16 is a back view illustrating the connectivity of adjacent landscape edging sections 10 and 10.1, illustrated as interlocked and secured together by the engagement of stake 80 at the intersection of adjacent edging sections 10 and 10.1.

Stake 80 is insertable between opposing upper tabs 48 and 68 and between opposing lower tabs 50 and 70. Stake 80 is forcibly driven into the soil until stake tabs 104 engage with upper tab 48 of edging section 10 and upper tab 68 of edging section 10.1.

When stake tabs 104 engage with upper tabs 48 of first connector 46 of first edging section 10, and with upper tab 68 of second connector 66 of second edging section 10.1, stake 80 prohibits vertical disengagement of first edging section 10 from second edging section 10.1.

As shown in FIG. 16, stops 86 have been driven past upper tabs 48 and 68, forcing upper tabs 48 and 68 to bend outward until stops 86 pass beneath the lower end of upper tabs 48 and 68. Stops 86 pass beneath the lower end of upper tabs 48 and 68 at the same time as stake tabs 104 engage the top of upper tabs 48 and 68. At that point, upper tabs 48 and 68 spring back against rails 82 of stake 80. In this position, stops 86 act to resist uplift of stake 80 due to soil upheave by engaging the lower edges of upper tabs 48 and 68 and distributing the upward force on stake 80 to edging sections 10 and 10.1.

Figure 17:
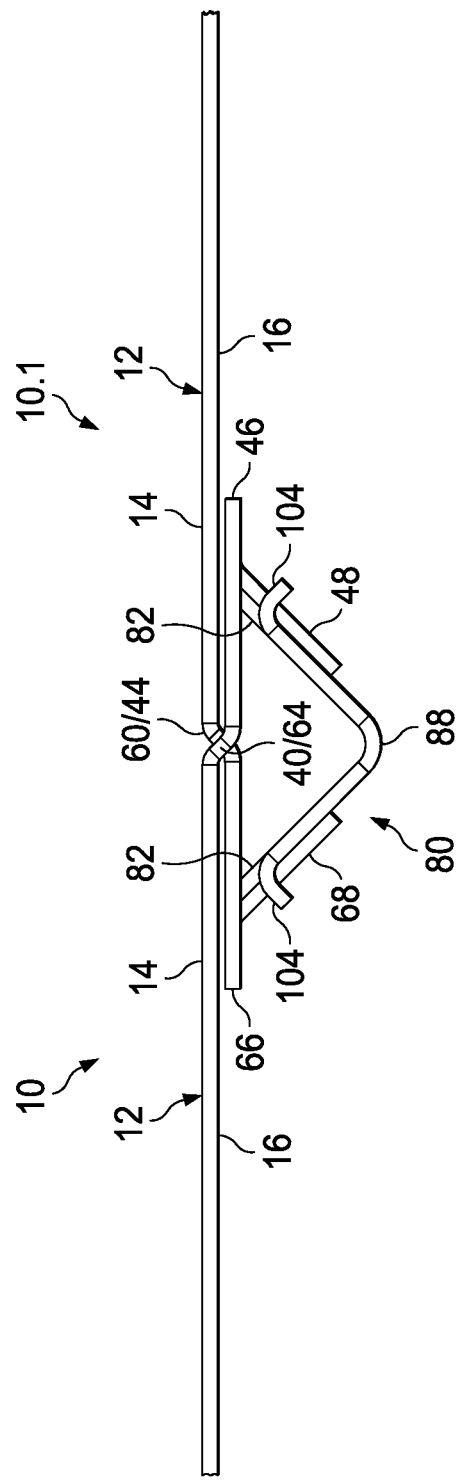
FIG. 17 is a top view illustrating the connectivity of the adjacent landscape edging sections illustrated in FIG. 16.

FIG. 17 is a top view illustrating the connectivity of the adjacent landscape edging sections 10 and 10.1 illustrated in FIG. 16. As seen in this view, stake tabs 104 have been formed at an approximate right angle to rails 82 along an axis parallel to radial spine 88. As stated, rails 82 are disposed at an angle of approximately 90° to each other. Because upper tabs 48 and 68 and lower tabs 50 and 70 extend from first and second connectors at an angle slightly less than 45°, inserting stake 80 spreads upper tabs 48 and 68 and lower tabs 50 and 70 away from first and second connectors 46 and 66 until stake 80 is fully received.

In this manner, stake 80 is held in interference fit. Compression force is translated to stake 80 by the outward bending force acting on upper tabs 48 and 68 and lower tabs 50 and 70 to receive stake 80. This force secures rails 82 against first and second connectors 46 and 66.

In FIG. 17, first transition 40 of edging section 10 is shown inserted in second slot 64 of edging section 10.1. Below the engagement of transition 40 inside second slot 64, transition 60 of edging section 10.1 is inserted inside first slot 44 of edging section 10. This vertical engagement interlocks edging section 10 to edging section 10.1, and secures edging section 10 from lateral disengagement with edging section 10.1.

By offset 42, first connector 46 is positioned parallel to wall portion 12 of edging section 10.1. By offset 62, second connector 66 is positioned parallel to wall portion 12 of edging section 10. (See FIG. 6 regarding offsets 42 and 62).

Figure 18:
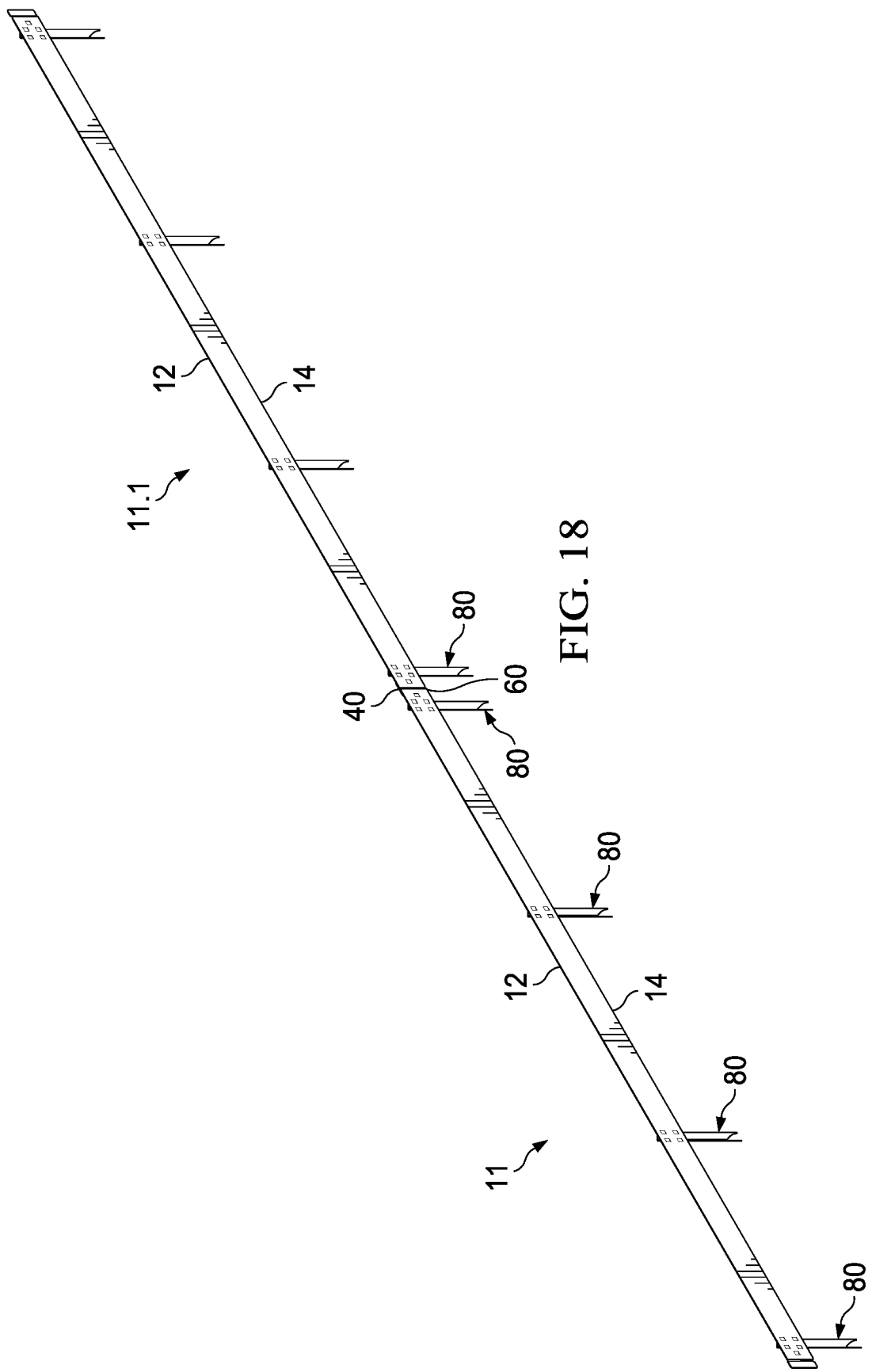
FIG. 18 is an isometric view of a second embodiment of the landscape edging system of the present invention.
Figure 19:
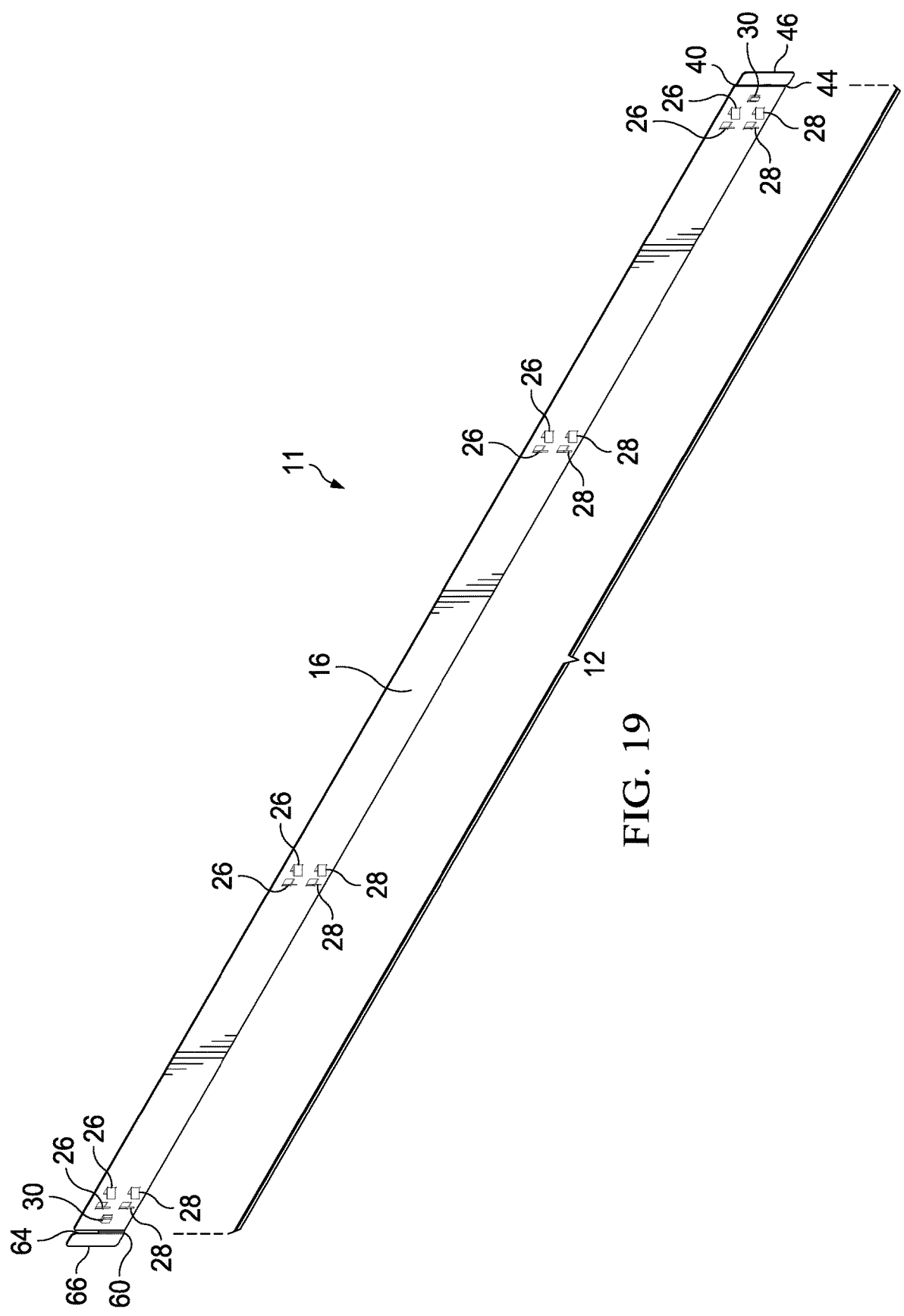
FIG. 19 is an isometric view of an edging section of the second embodiment of the landscape edging system.

FIG. 18 is an isometric view of a second embodiment of landscape edging system 1. The embodiment illustrated in FIGS. 19 through 24 represents an embodiment with significant importance to commercial landscaping applications. This embodiment further illustrates an alternative interlock mechanism as between adjacent edging sections 11 and 11.1. As shown in FIGS. 18 and 19, edging sections 11 for use in commercial landscaping applications are often considerably longer than edging sections 10 used for residential applications.

FIG. 19 is an isometric view of edging section 11 of the second embodiment of landscape edging system 1. Edging section 11 has a wall portion 12. Edging section 11 has a front side 14 (see FIG. 18) and a back side 16.

A first transition 40 extends transversely and rearward from a first end of wall portion 12. A first slot 44 extends from a bottom of first transition 40 at least a midpoint of first transition 40. A first connector 46 extends from first transition 40 outwardly and substantially parallel to wall portion 12. An interlock tab 30 extends outward from wall portion 12, parallel to wall portion 12 at a location proximate to first transition 40, and having an opening that faces first transition 40.

A second transition 60 extends transversely and rearward from a second end of wall portion 12. A second slot 64 extends from a top of second transition 60 to at least a midpoint of second transition 60. A second connector 66 extends from second transition 60 outwardly and substantially parallel to wall portion 12. Interlock tab 30 extends outward from wall portion 12, parallel to wall portion 12 at a location proximate to second transition 60, and having an opening that faces second transition 60.

A pair of opposing upper wall tabs 26 extend outward from back side 16 of wall portion 12. A pair of opposing lower wall tabs 28 extend outward from back side 16 of wall portion 12, in vertical alignment with upper wall tabs 26.

Figure 20:
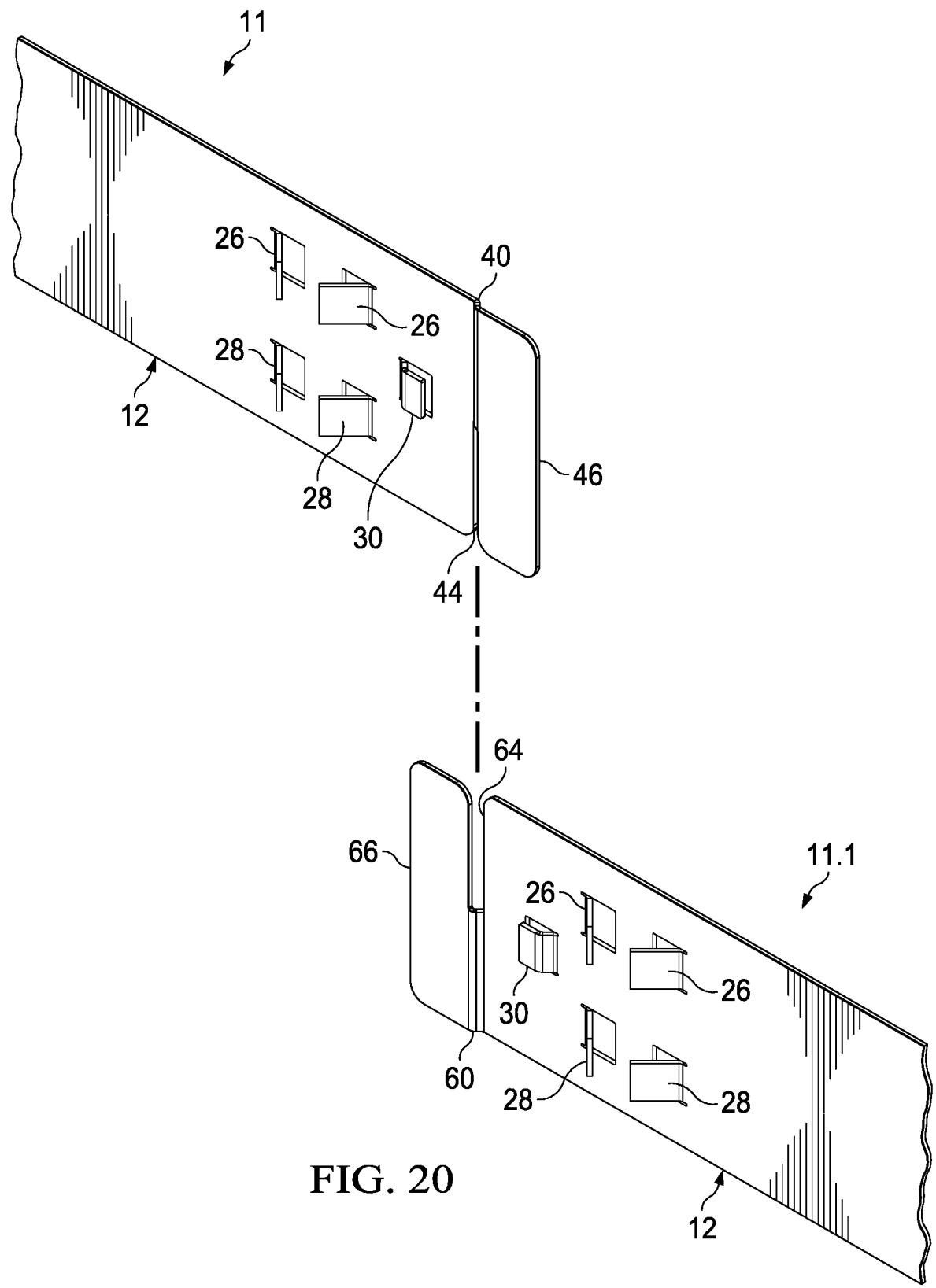
FIG. 20 is an exploded isometric view of adjacent edging sections of the second embodiment of the landscape edging system.

FIG. 20 is an exploded isometric view of pre-assembly alignment of adjacent edging sections 11 and 11.1. As seen in this view, first slot 44 is receivable of second transition 60. Simultaneously, second slot 64 receives first transition 40.

Figure 21:
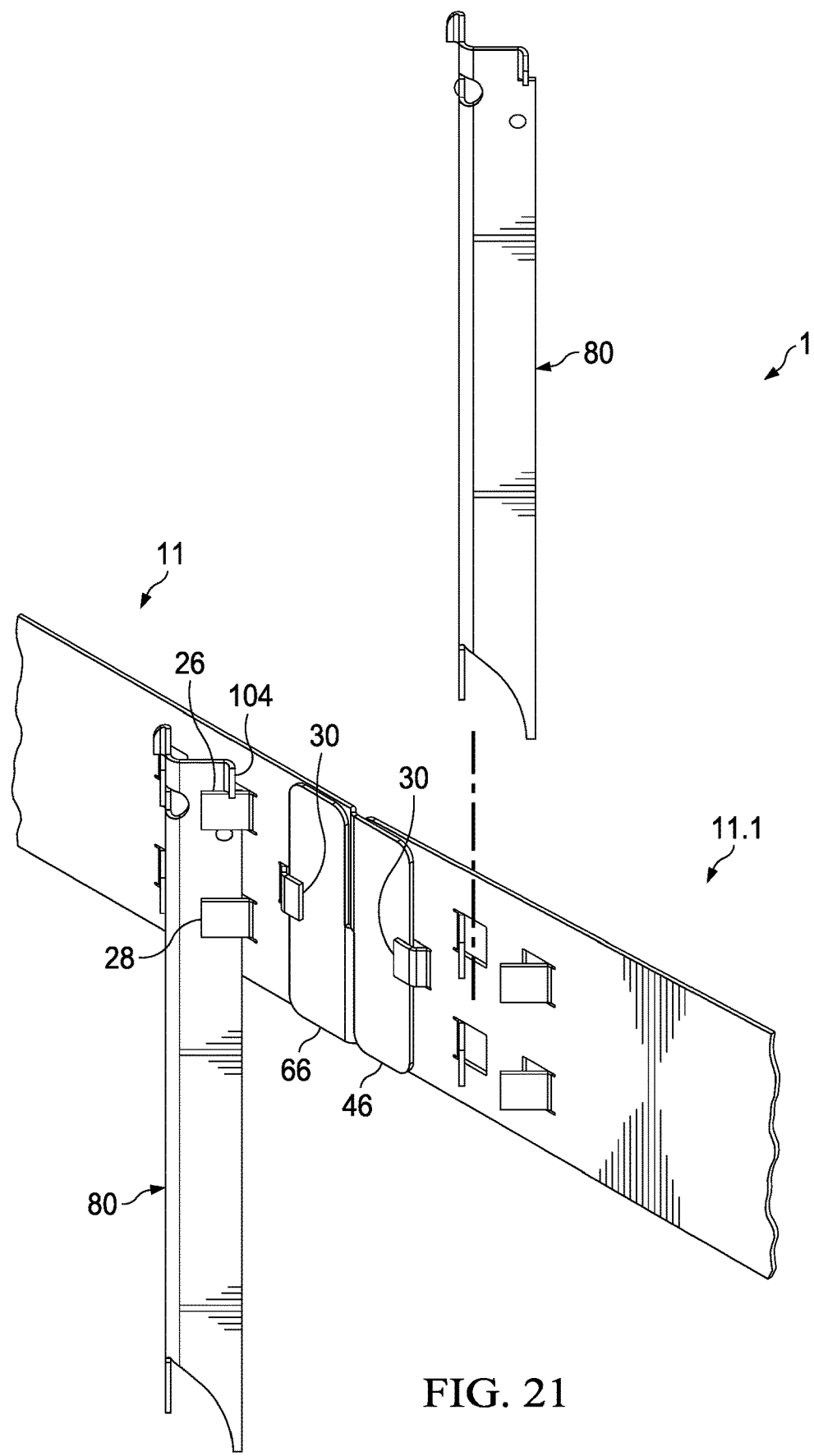
FIG. 21 is an isometric view of partially assembled adjacent edging sections of the second embodiment of the landscape edging system.

FIG. 21 is an isometric view of the assembly of adjacent edging sections 11 and 11.1 of the second embodiment of the landscape edging system 11. In this view, first slot 44 has received second transition 60 and second slot 64 has received first transition 40. In addition to this interlocking engagement, first connector 46 is received in interlock tab 30 on edging section 11.1, while second connector 66 has been received in interlock tab 30 of edging section 11. As received, edging section 11 and edging section 11.1 are successfully interlocked and highly resistant to separation or disengagement in the horizontal plane.

Figure 22:
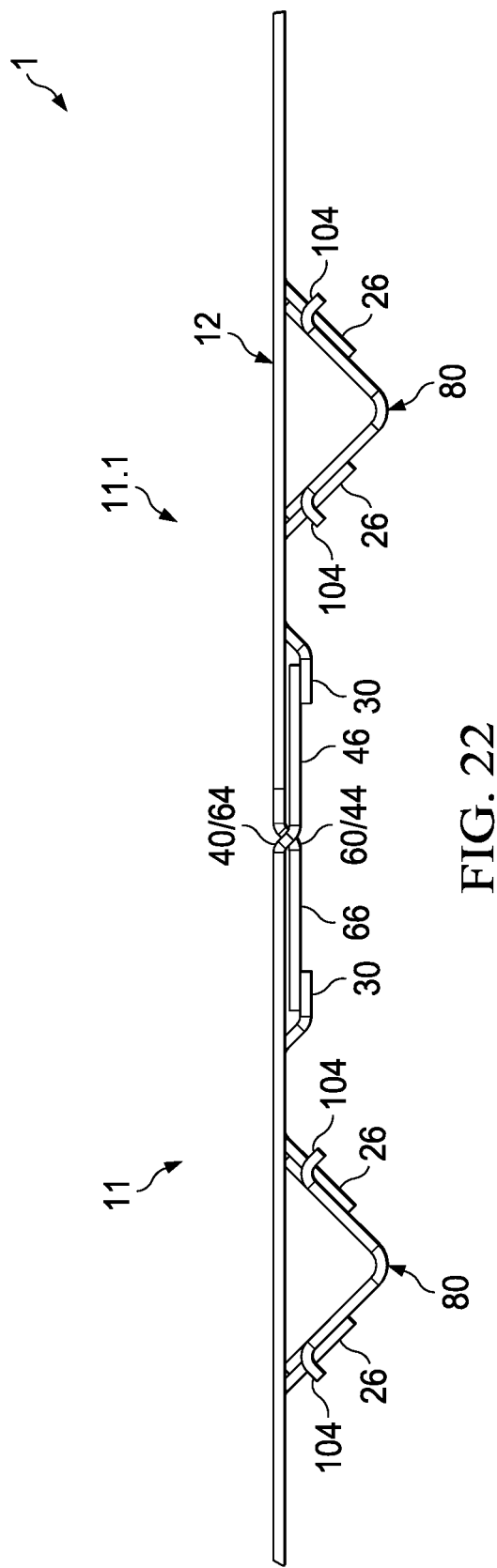
FIG. 22 is a top view illustrating the connectivity of adjacent landscape edging sections of the second embodiment of the landscape edging system, illustrated as fully assembled.

Opposing upper wall tabs 26 and opposing lower wall tabs 28 form a rectangular receiving structure for receiving stake 80. Stake 80 is insertable between upper tabs 26 and lower tabs 28 of wall portion 12. Stake tabs 104 engage upper tabs 26 to secure edging sections 11 and 11.1 to the soil. FIG. 22 is a top view illustrating the connectivity of adjacent edging sections 11 and 11.1, illustrated as fully assembled.

Figure 23:
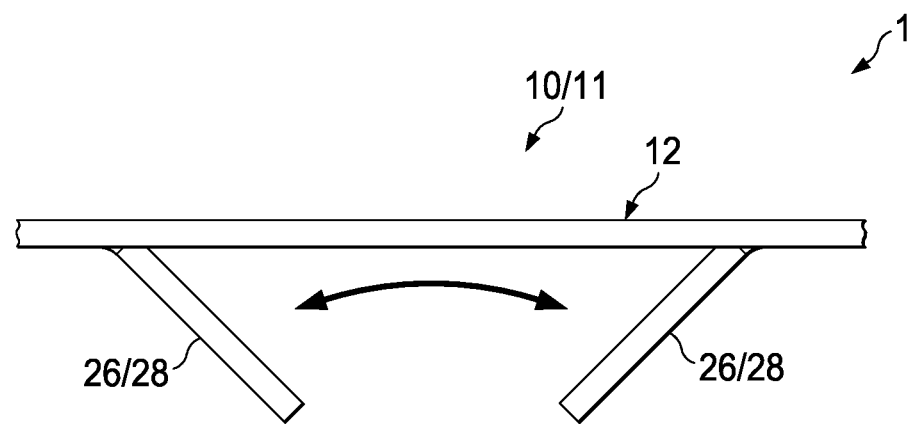
FIG. 23 is a top view illustrating the force acting on the upper and lower tabs that engage the stake to secure the stake against the edging section.

FIG. 23 is a top view illustrating the bending force acting on upper and lower tabs of the first and second embodiments of landscape edging system 1 that engage stake 80 to secure stake 80 against edging sections 10 and 11. As was illustrated in FIG. 17, it is noted that in the first embodiment, stakes 80 are compressed against first connector 46 and second connector 66 by upper tabs 48 and 68 and lower tabs 50 and 70 (FIG. 16). However, the principles illustrated and disclosed herein are the same with regards to compression of stake 80 within the edging section (10/11) in which it is installed.

Figure 24:
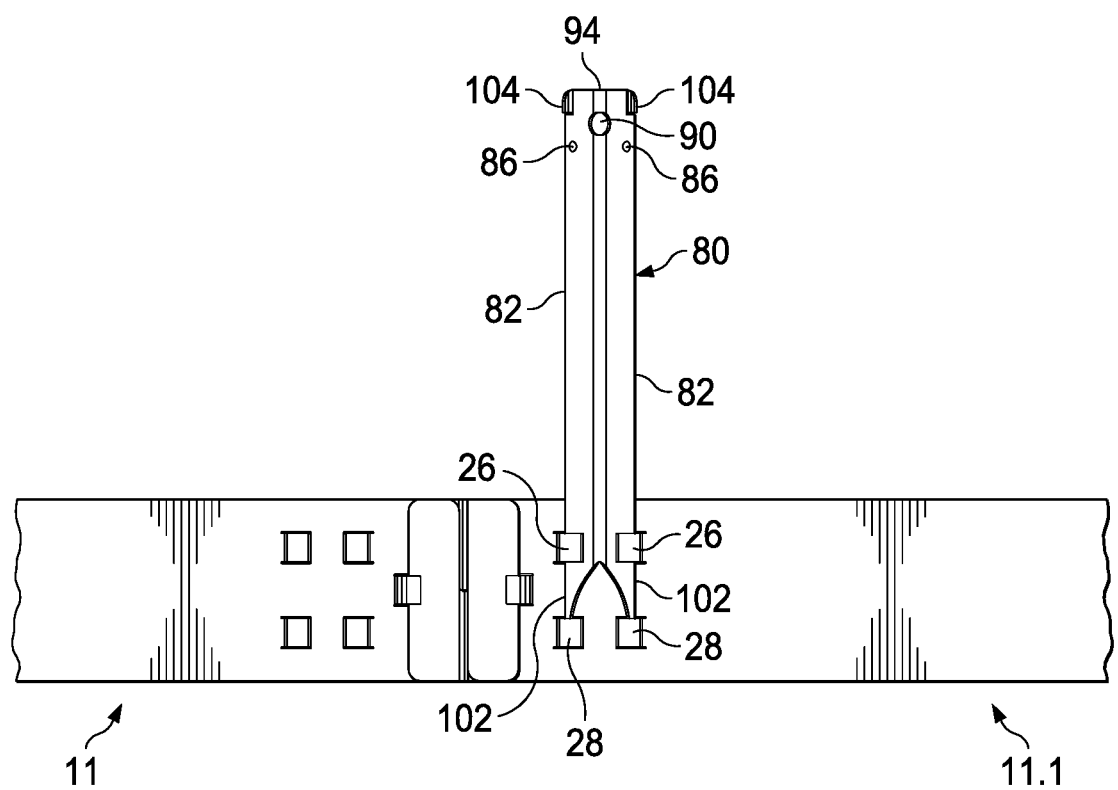
FIG. 24 is a top view illustrating the connectivity of adjacent landscape edging sections of the second embodiment of a landscape edging system.

FIG. 24 is a back view illustrating the connectivity of adjacent edging sections 11 and 11.1. As seen in this view, the advantage of double pointed ends 102 of stake 80 is that it presents itself in immediate alignment with both lower tabs 28 on insertion. This permits stake 80 to be in perpendicular alignment with edging sections 11 and 11.1 when initially contacting the soil.

Figure 25:
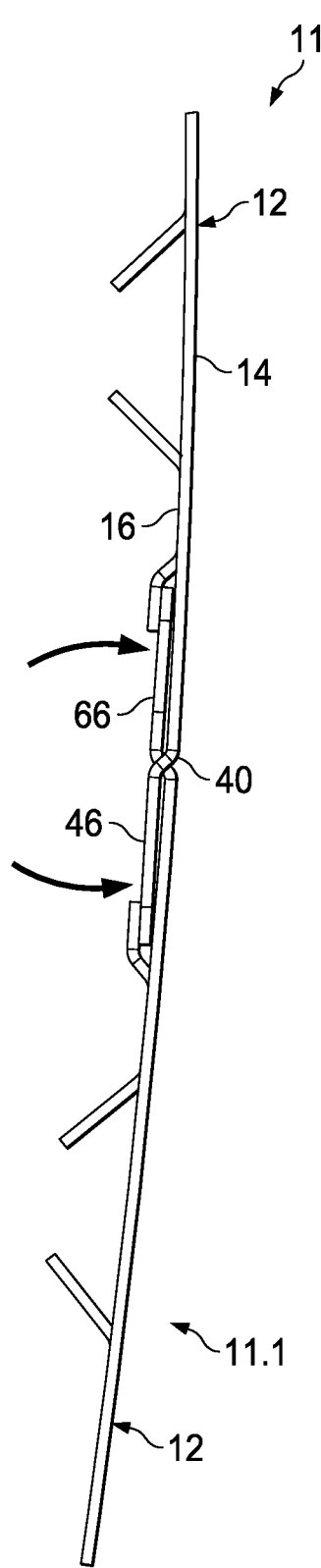
FIG. 25 is a top view of assembled adjacent edging sections of the second embodiment of the landscape edging system, illustrating the forces acting on the assembly having an outside curve.

FIG. 25 is a top view of assembled adjacent edging sections 11 and 11.1, illustrating the forces acting on landscape edging system 1 when installed to have an outside curve. As seen in FIG. 25, outside curve assembly results in compressive force between first connector 46 and back side 16 of wall portion 12, as well as between second connector 66 and back side 16 of wall portion 12.

Figure 26:
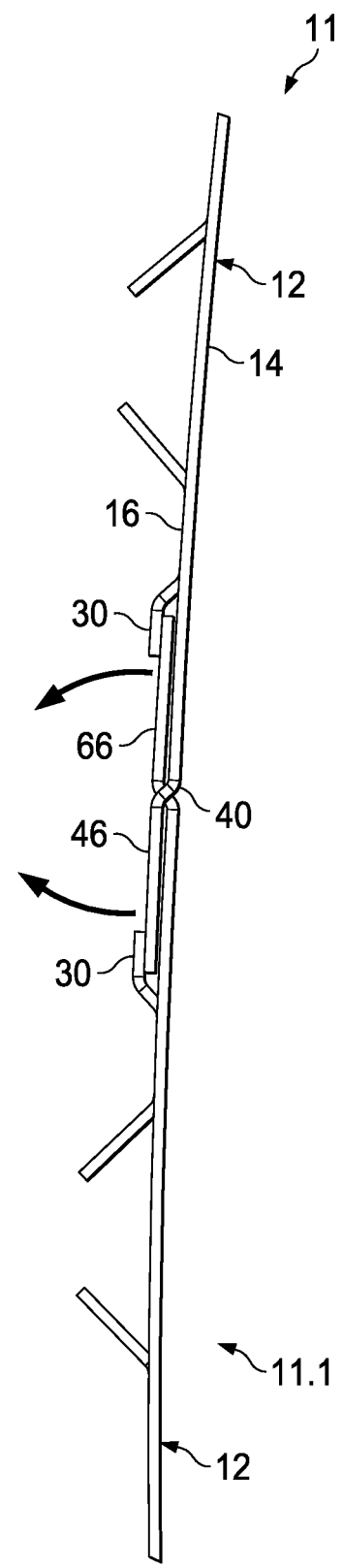
FIG. 26 is a top view of assembled adjacent edging sections of the second embodiment of the landscape edging system, illustrating the forces acting on the assembly having an inside curve.

FIG. 26 is a top view of assembled adjacent edging sections 11 and 11.1, illustrating the forces acting on landscape edging system 1 when installed to have an inside curve. As seen in FIG. 26, inside curve assembly results in an additional compressive force between first connector 46 and interlock tab 30, and also as between second connector 66 and interlock tab 30.

Thus, regardless of whether landscape edging system 1 is installed having an outside curve or an inside curve, the interlocking system disclosed herein secures adjacent edging sections 11 and 11.1 together without disengagement, even before stakes 80 are installed. This is a significant improvement over landscape edging systems that require straight alignment of adjacent sections to insert stakes and interlock adjacent edging sections.

Figure 27:
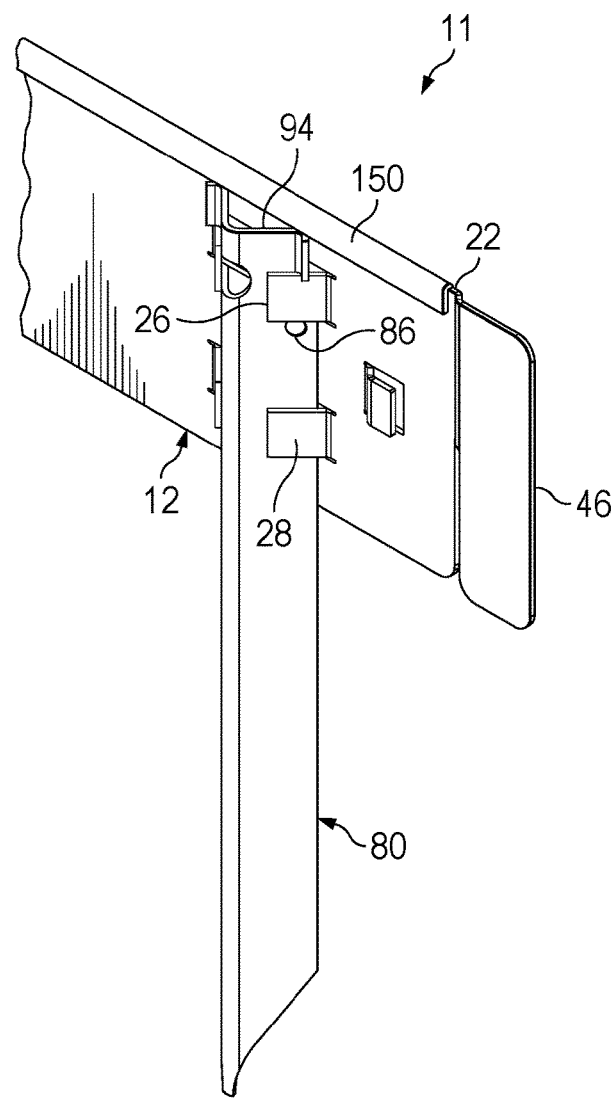
FIG. 27 is an isometric sectional view of the second embodiment of the landscape edging system, illustrating a wall portion having an edge fold at the top of the edging section.

FIG. 27 is an isometric sectional view of edging section 11, in which top edge 22 includes an edge fold 150. As seen in this view, the advantage of edge fold 150 is that it provides a safer working surface for the installer to hold when installing edging section 11 into the ground. Edge fold 150 is rounded and thus not as sharp as top edge 22. An additional benefit of this embodiment is that edge fold 150 provides a structure to engage upper end 94 of stake 80. In this manner, edge fold 150 assists stop 86 in prevention of upheave of stake 80 (not shown).

Figure 28:
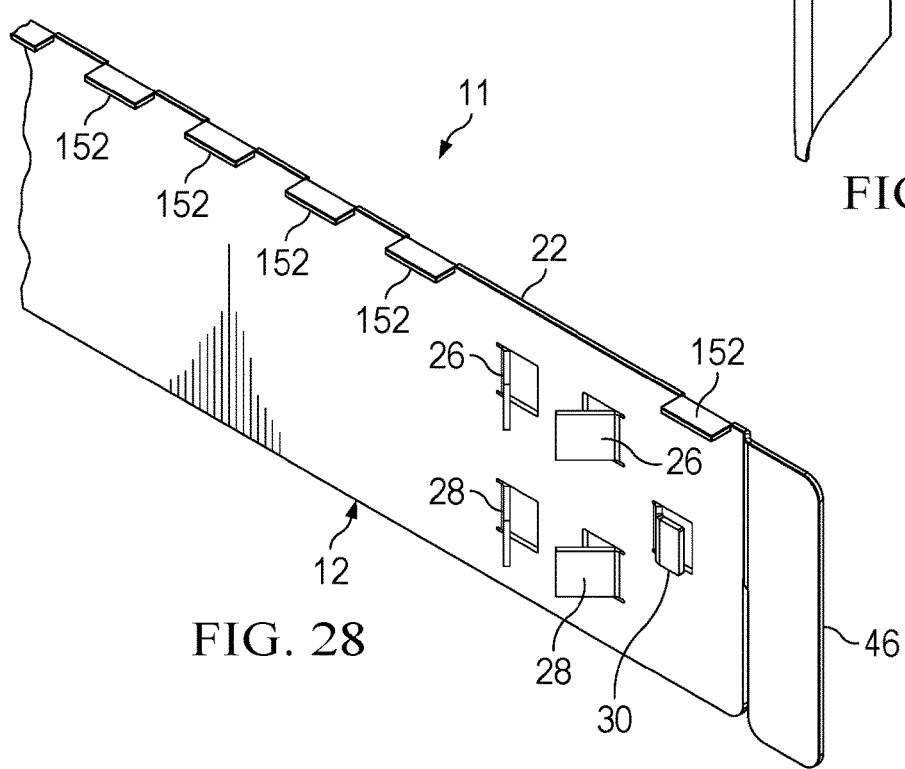
FIG. 28 is an isometric sectional view of the second embodiment of the landscape edging system, illustrating the wall portion having screed tabs for use of the landscape edging system as a concrete form.

FIG. 28 is an isometric sectional view of edging section 11, which includes a plurality of screed tabs 152 extending perpendicularly from top edge 22 relative to wall portion 12. In this embodiment, landscape edging system 1 can be used as a concrete form and screed tabs 152 provide indicia for the level of the concrete and a guide for the screed, without interfering with the installation of stake 80 (not shown) between upper tabs 26 and lower tabs 28. By arranging the screed tabs 152 intermittently, edging section 11 remains flexible and may be curved to match a desired radius or bent to match a desired angle.

Figure 29:
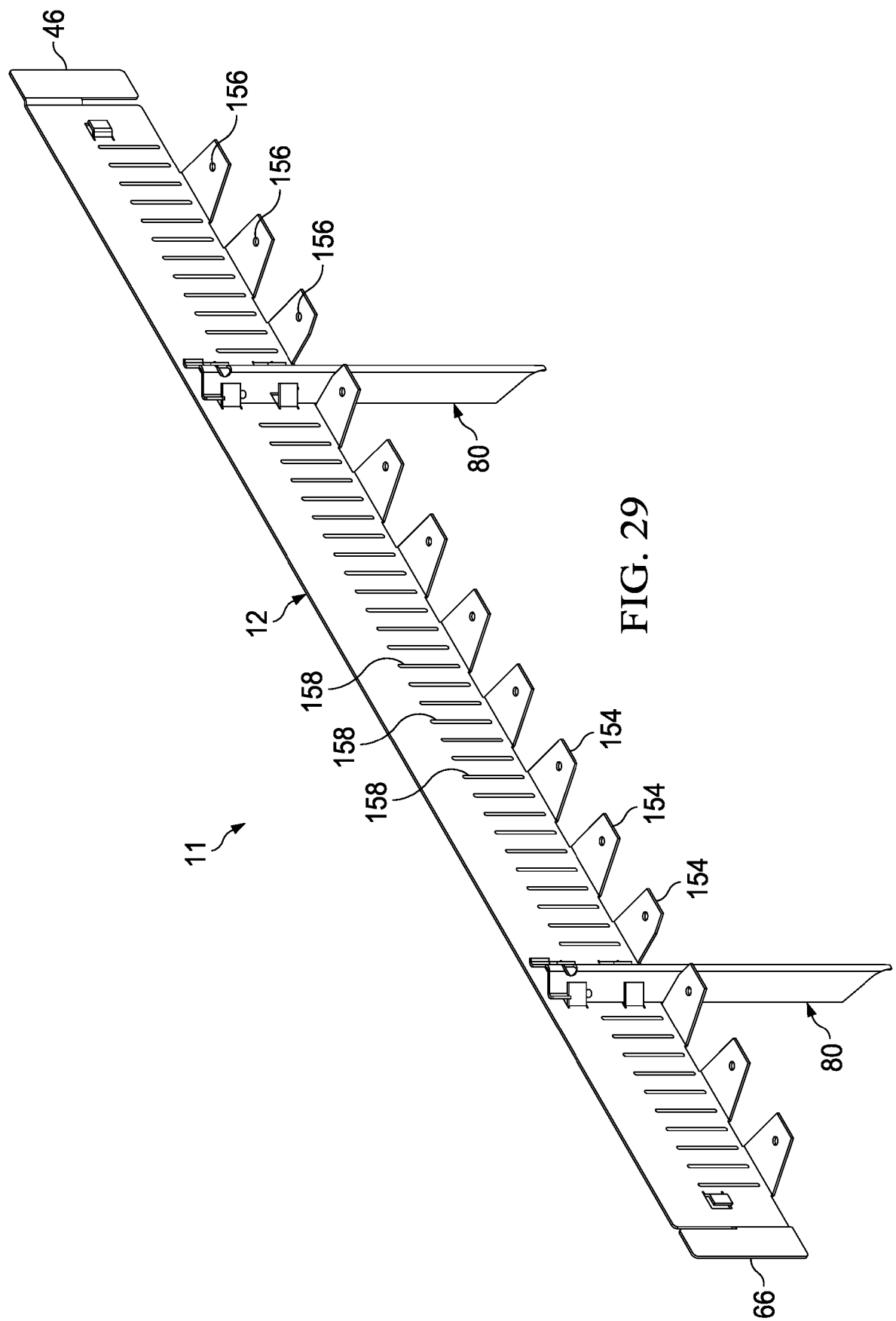
FIG. 29 is an isometric view of the second embodiment of the landscape edging system, illustrating the wall portion having optional drains and optional paver tabs.

FIG. 29 is an isometric view of edging section 11, in which wall portion 12 includes a plurality of drains 158. Drains 158 may be slots, orifices, or other geometry that allow water to pass through wall portion 12. Drains 158 are advantageous for use when edging section 11 is located on a sloped surface, adjacent to solid surfaces such as pavers, or on a rooftop, or other location where rainwater or storm water runoff may accumulate.

Also disclosed in FIG. 29, edging section 11 may include a plurality of paver tabs 154. Paver tabs 154 are advantageous for use when landscape edging system 1 is applied as a perimeter to paving stones. In this embodiment, edging section 11 provides a structural barrier to prevent pavers from separating and may also prevent intrusion of other landscape features into the paved area.

Figure 30:
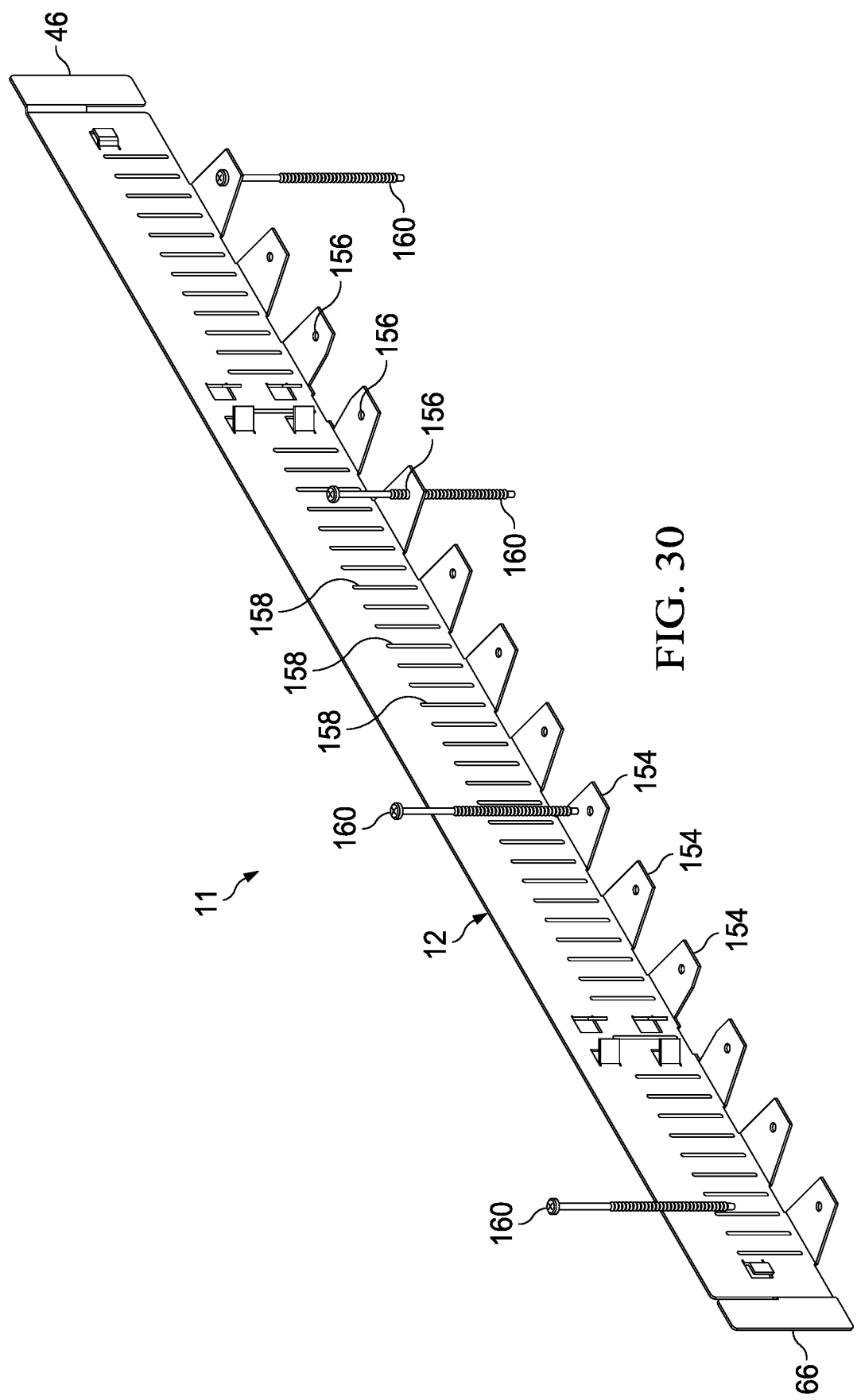
FIG. 30 is an isometric view of the second embodiment of the landscape edging system, illustrating the wall portion having optional drains and paver tabs with orifices for attachment to a roof system.

FIG. 30 is an isometric view of edging section 11, illustrating the use of landscape edging system 1 in a roof application. Wall portion 12 may include a plurality of drains 158. In this application, paver tabs 154 are used to secure edging section 11 to the roof. Paver tabs 154 include an orifice 156 to allow a roof adapted fastener 160, such as roofing screws used on commercial roofs. Fasteners 160 are inserted in orifice 156 and affixed to the roof, balcony, terrace, or other such structure. Pavers or other landscape features can then be contained by landscape edging system 1.

As used herein, the term "substantially" is intended for construction as meaning "more so than not". It will be understood by a person of ordinary skill in the art that the landscape edging system disclosed yields itself to cold forming as an expeditious manner of manufacture. As such, directional expressions such as "perpendicular" and "parallel" are understood as generally indicated, and not with high precision, and do not indicate a degree of precision greater than a tolerance of ±15 degrees. In contrast, angles that are expressly identified herein are understood to have a tolerance of ±3 degrees. A range of angles expressly identified herein is understood to have a tolerance of +3 degrees and −3 degrees.

As disclosed herein, the end sections and edging sections are reversible. As such, references to "upper" and "lower" and "top" and "bottom" are interchangeable. Such as used in reference to slots or tabs.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure, and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A landscape edging system, comprising:
  a first edging section, comprising:
    a longitudinal wall portion having a front side and an opposite back side;
    a first transition extending transversely and rearward from a first end of the wall portion;
    a first slot extending from a bottom of the first transition to at least a midpoint of the first transition;
    a second transition extending transversely and rearward from an opposite second end of the wall portion;
    a second slot extending from a top of the second transition to at least a midpoint of the second transition;
    a first connector extending from the first transition, outwardly and substantially parallel to the wall portion;
    a second connector extending from the second transition, outwardly and substantially parallel to the wall portion;
    an upper tab extending from the first connector at an acute angle;
    an upper tab extending from the second connector at an acute angle;
    a V-shaped stake, comprising:
      a pair of opposing rails extending from a radial spine to a rail edge;
      an upper end for receiving impact forces;
      a pointed lower end for insertion into a soil; and,
      a stake tab formed at the upper end on each rail edge; and,
    the first slot receivable of the second transition of a second edging section to interlock the first and second edging sections together;
    the stake insertable between the upper tab of the first connector and the upper tab of the second connector of the second edging section; and,
    the stake tabs engageable with the upper tab of the first connector and the upper tab of the second connector of the second edging section.

2. The edging system of claim 1, further comprising:
  a lower tab extending from the first connector at an acute angle;
  a lower tab extending from the second connector at an acute angle; and,
  the stake insertable between the lower tab of the first connector and the lower tab of the second connector of the second edging section.

3. The edging system of claim 2, further comprising:
  the second landscape edging section engaged with the first landscape edging section; and,
  wherein the stake is driven between the upper tabs and lower tabs of the first edging section and the upper tabs and lower tabs of the second edging section, the stake spreads the upper and lower tabs away from the first and second connectors to secure the stake in interference fit as between the upper and lower tabs and the connectors.

4. The edging system of claim 2, further comprising:
  the second landscape edging section engaged with the first landscape edging section; and,
  wherein the stake is driven between the upper tabs and lower tabs of the first edging section and the upper tabs and lower tabs of the second edging section, the upper and lower tabs of the first and second edging sections compress the stake against the first and second connectors to secure the stake in interference fit as between the upper and lower tabs and the connectors.

5. The edging system of claim 2, further comprising:
  the second landscape edging section engaged with the first landscape edging section; and,
  wherein the stake is driven between the upper tabs and lower tabs of adjacently connected edging sections, the stake tabs impart a downward force on the upper tabs to secure the edging section against the soil.

6. The edging system of claim 2, further comprising:
  the stake rails disposed at an angle of approximately 90° to each other; and,
  the upper and lower tabs extending from the first connector at an angle of between 30° and 45°. edging section against the soil.

7. The edging system of claim 2, further comprising:
  each lower tab beneath and vertically aligned with a respective upper tab; and,
  each upper tab and lower tab extending in the direction of the back side of the wall.

8. The edging system of claim 2, further comprising:
  an end cap, comprising:
    a wall portion comprising;
      a front side; and,
      a back side opposite to the front side; and a first transition extending transversely and rearward from a first end of the wall portion;

a first slot extending from a bottom of the first transition to at least a midpoint of the first transition;

a first connector extending from the first transition, outwardly and substantially parallel to the wall portion;

an upper tab and a lower tab extending from the first connector;

the first slot of the end cap is receivable of the first transition of the first edging section to interlock the end cap and edging section together;

wherein when so interlocked, the stake is insertable between the upper tabs and lower tabs of the first connector of the end cap and the upper tabs and lower tabs of the first connector of the first edging section; and, the stake having stake tabs engageable with the upper tabs of the first connector of the first and cap and the upper tabs of the first connector of the first edging section.

9. The edging system of claim 1, further comprising:
upon insertion of the stake, the stake rail edges engage the first connector and the second connector of adjacently connected edging sections.

10. The edging system of claim 1, further comprising:
the stake tabs having an upper end and a lower end; and, the lower end of the stake tabs being engageable with the upper tabs of adjacently connected edging sections.

11. The edging system of claim 1, further comprising:
wherein connection of the first edging section with the second edging section provides a smooth surface appearance on the front side of the connected edging sections.

12. The edging system of claim 1, further comprising:
wherein connection of the first edging section with the second edging section provides a continuous surface appearance on the front side of the connected edging sections.

13. The edging system of claim 1, further comprising:
the stake having a beveled lower end for reduced resistance to insertion into a soil.

14. The edging system of claim 1, the stake further comprising:
the pointed lower end being a double pointed lower end.

15. The edging system of claim 1, further comprising:
the stake tabs being formed at an approximate right angle to the rails along an axis parallel to the radial spine.

16. The edging system of claim 1, further comprising:
the wall having a thickness equal to the distance between the front side and the back side; and,
the first transition and second transition being of a length sufficient to offset the first connector and the second connector from the wall portion by a distance equal to or greater than the thickness.

17. The edging system of claim 1, further comprising:
the upper and lower tabs formed by stamping.

18. The edging system of claim 1, further comprising:
the stake tabs formed by stamping.

19. The edging system of claim 1, further comprising:
the stake tabs extending in a direction substantially perpendicular to the rails.

20. The edging system of claim 1, further comprising:
the stake having an aperture located through the radial spine and between the stake tabs; and,
wherein the aperture provides a connection structure for surface prep and coating of stakes, securing stakes together for shipping, and as a tool engagement structure for removal of stakes from the soil.

21. The edging system of claim 1, further comprising:
a pair of opposing upper wall tabs extending outward from the back side of the wall;
a pair of opposing lower wall tabs extending outward from the back side of the wall; and,
the upper and lower wall tabs receivable of a stake for securing a central portion of the edging section to the soil.

22. The edging system of claim 1, the stake further comprising:
a stop embossed onto the rail beneath the stake tab, and extending rearward; and,
the stop engaging the upper tab of one of the connectors to resist soil upheave of the stake.

23. A landscape edging system, comprising:
a first longitudinal edging section, comprising:
a wall portion;
a front side; and,
a back side opposite to the front side;
a first transition extending transversely and rearward from a first end of the wall portion;
a first slot extending from a bottom of the first transition to at least a midpoint of the first transition;
a first connector extending from the first transition, outwardly and substantially parallel to the wall portion;
a first interlock tab extending outward from the wall portion at a location proximate to the first transition;
a second transition extending transversely and rearward from an opposite second end of the wall portion;
a second slot extending from a top of the second transition to at least a midpoint of the second transition;
a second connector extending from the second transition, outwardly and substantially parallel to the wall portion;
a second interlock tab extending outward from the wall portion at a location proximate to the second transition;
the first slot receivable of a second transition of a second edging section;
the first interlock tab receivable of a second connector of the second edging section;
a pair of opposing upper tabs extending outward from the back side of the wall;
a pair of opposing lower tabs extending outward from the back side of the wall, in vertical alignment with the upper wall tabs;
a stake insertable between the upper tabs of the wall portion; and,
the stake tabs engageable with the upper tabs of the wall portion to secure the edging section into a soil;
the stake being a V-shaped stake, comprising:
a pair of opposing rails extending from a radial spine to a rail edge;
a stake tab formed at the upper end on each rail edge;
an upper end for receiving impact forces; and,
a pointed lower end for insertion into a soil; and,
the stake tabs being formed at an approximate right angle to the rails along an axis parallel to the radial spine.

24. The landscape edging system of claim 23, further comprising:
the second slot receivable of a first transition of a second edging section; and
the second interlock tab receivable of a first connector of the second edging section.

25. The landscape edging system of claim 23, further comprising:
the stake tabs having an upper end and a lower end; and, the lower end of the stake tabs being engageable with the upper tabs of the wall portion.

26. The landscape edging system of claim 25, further comprising:
wherein upon driving the stake downward between the upper tabs and the lower tabs of the first edging section, the stake spreads the upper and lower tabs away from the back side of the wall to secure the stake in interference fit as between the tabs and the back side of the wall.

27. The landscape edging system of claim 23, further comprising:
wherein the stake is driven between the upper tabs and lower tabs, the stake tabs impart a downward force on the upper tabs to secure the edging section against the soil.

28. The landscape edging system of claim 23, further comprising:
wherein connection of the first edging section with the second edging section provides a continuous surface appearance on the front side of the connected edging sections.

29. The landscape edging system of claim 23, further comprising:
the stake having a beveled lower end for reduced resistance to insertion into a soil.

30. The landscape edging system of claim 23, the stake further comprising:
a double pointed lower end.

31. The landscape edging system of claim 23, further comprising:
each lower tab beneath and vertically aligned with a respective upper tab; and,
each upper tab and lower tab extending in the direction of the back side of the wall.

32. The landscape edging system of claim 23, further comprising:
the wall having a thickness equal to the distance between the front side and the back side; and,
the first transition and second transition being of a length sufficient to offset the first connector and the second connector from the wall portion by a distance equal to or greater than the thickness.

33. The landscape edging system of claim 23, further comprising:
the upper and lower tabs formed by stamping.

34. The landscape edging system of claim 23, further comprising:
the stake tabs formed by stamping.

35. The landscape edging system of claim 23, further comprising:
the stake tabs extending in a direction substantially perpendicular to the rails.

36. The landscape edging system of claim 23, further comprising:
the stake having an aperture located through the radial spine and between the stake tabs; and,
wherein the aperture provides a connection structure for surface prep and coating of stakes, securing stakes together for shipping, and as a tool engagement structure for removal of stakes from the soil.

37. The landscape edging system of claim 23, further comprising:
a plurality of screed tabs extending perpendicularly from the wall portion.

38. The landscape edging system of claim 23, further comprising:
a plurality of drains located on the wall portion of the edging system.

39. The landscape edging system of claim 23, further comprising:
a plurality of paver tabs extending perpendicularly from the wall portion; and,
an orifice on a paver tab for receiving a fastener.

40. The landscape edging system of claim 23, further comprising:
the wall portion having an edge fold; and,
wherein full insertion of the stake between the upper tabs and lower tabs of the edging section provides engagement of the upper end of the stake with the edge fold to resist upheave of the stake in a soil.

41. A landscape edging system, comprising:
a first longitudinal edging section, comprising:
a wall portion;
a front side; and,
a back side opposite to the front side;
a first transition extending transversely and rearward from a first end of the wall portion;
a first slot extending from a bottom of the first transition to at least a midpoint of the first transition;
a first connector extending from the first transition, outwardly and substantially parallel to the wall portion;
a first interlock tab extending outward from the wall portion at a location proximate to the first transition;
a second transition extending transversely and rearward from an opposite second end of the wall portion;
a second slot extending from a top of the second transition to at least a midpoint of the second transition;
a second connector extending from the second transition, outwardly and substantially parallel to the wall portion;
a second interlock tab extending outward from the wall portion at a location proximate to the second transition;
the first slot receivable of a second transition of a second edging section;
the first interlock tab receivable of a second connector of the second edging section;
a pair of opposing upper tabs extending outward from the back side of the wall;
a pair of opposing lower tabs extending outward from the back side of the wall, in vertical alignment with the upper wall tabs;
a stake insertable between the upper tabs of the wall portion; and,
the stake tabs engageable with the upper tabs of the wall portion to secure the edging section into a soil;
the stake being a V-shaped stake, comprising:
a pair of opposing rails extending from a radial spine to a rail edge;
a stake tab formed at the upper end on each rail edge;
an upper end for receiving impact forces; and,
a pointed lower end for insertion into a soil; and,
the stake rails disposed at an angle of approximately 90° to each other; and,
the upper and lower tabs extending from the first connector at an angle of between 30° and 45°.

42. A landscape edging system, comprising:
a first longitudinal edging section, comprising:
a wall portion;
a front side; and,
a back side opposite to the front side;
a first transition extending transversely and rearward from a first end of the wall portion;
a first slot extending from a bottom of the first transition to at least a midpoint of the first transition;

a first connector extending from the first transition, outwardly and substantially parallel to the wall portion;

a first interlock tab extending outward from the wall portion at a location proximate to the first transition;

a second transition extending transversely and rearward from an opposite second end of the wall portion;

a second slot extending from a top of the second transition to at least a midpoint of the second transition;

a second connector extending from the second transition, outwardly and substantially parallel to the wall portion;

a second interlock tab extending outward from the wall portion at a location proximate to the second transition;

the first slot receivable of a second transition of a second edging section;

the first interlock tab receivable of a second connector of the second edging section;

a pair of opposing upper tabs extending outward from the back side of the wall;

a pair of opposing lower tabs extending outward from the back side of the wall, in vertical alignment with the upper wall tabs;

a stake insertable between the upper tabs of the wall portion; and, the stake tabs engageable with the upper tabs of the wall portion to secure the edging section into a soil;

the stake being a V-shaped stake, comprising:
    a pair of opposing rails extending from a radial spine to a rail edge;
    a stake tab formed at the upper end on each rail edge;
    an upper end for receiving impact forces; and,
    a pointed lower end for insertion into a soil;

the stake tabs having an upper end and a lower end; and, the lower end of the stake tabs being engageable with the upper tabs of adjacently connected edging sections;

the wall portion having an edge fold; and, wherein full insertion of the stake between the upper tabs and lower tabs of the edging section provides engagement of the upper end of the stake with the edge fold to resist upheave of the stake in a soil.

\* \* \* \* \*

UNITED STATES PATENT AND TRADEMARK OFFICE
CERTIFICATE OF CORRECTION

PATENT NO. : 11,712,007 B2
APPLICATION NO. : 17/485300
DATED : August 1, 2023
INVENTOR(S) : Merani et al.

It is certified that error appears in the above-identified patent and that said Letters Patent is hereby corrected as shown below:

In the Claims

Column 15, Line 20, Claim 8, delete "first and cap" and insert -- first end cap --

Signed and Sealed this
Fifth Day of March, 2024

Katherine Kelly Vidal
*Director of the United States Patent and Trademark Office*